US012782764B2

(12) United States Patent
Fuchimukai

(10) Patent No.: US 12,782,764 B2
(45) Date of Patent: Nov. 3, 2026

(54) OPTICAL ISOLATOR, ULTRAVIOLET LASER APPARATUS, AND ELECTRONIC DEVICE MANUFACTURING METHOD

(71) Applicant: Gigaphoton Inc., Tochigi (JP)

(72) Inventor: Atsushi Fuchimukai, Oyama (JP)

(73) Assignee: Gigaphoton Inc., Tochigi (JP)

(*) Notice: Subject to any disclaimer, the term of this patent is extended or adjusted under 35 U.S.C. 154(b) by 375 days.

(21) Appl. No.: 18/531,775

(22) Filed: Dec. 7, 2023

(65) Prior Publication Data

US 2024/0103305 A1 Mar. 28, 2024

Related U.S. Application Data

(63) Continuation of application No. PCT/JP2021/026593, filed on Jul. 15, 2021.

(51) Int. Cl.
*G02F 1/09* (2006.01)
*H01S 3/10* (2006.01)

(52) U.S. Cl.
CPC .......... *G02F 1/093* (2013.01); *H01S 3/10061* (2013.01)

(58) Field of Classification Search
CPC ..... G02F 1/093; G02B 27/28; H01S 3/10061; H01S 3/0064; H01S 3/0071;
(Continued)

(56) References Cited

U.S. PATENT DOCUMENTS 6,118,915 A * 9/2000 Sato ........................ G02B 6/264 385/39
2004/0086256 A1* 5/2004 Gustavson ............. G02B 6/266 385/11
(Continued)

FOREIGN PATENT DOCUMENTS

EP 1072938 A2 1/2001
JP 2007-183419 A 7/2007
(Continued)

OTHER PUBLICATIONS

International Search Report issued in PCT/JP2021/026593; mailed Oct. 5, 2021.
(Continued)

*Primary Examiner* — Mustak Choudhury
(74) *Attorney, Agent, or Firm* — Studebaker Brackett PLLC

(57) ABSTRACT

An optical isolator includes an enclosure, a first polarizer disposed in the enclosure, a first Faraday rotator including a first Faraday material rotating a polarization direction of the light having passed through the first polarizer, and a first magnet producing a first magnetic field applied to a first magnetic field generation region where the first Faraday material is disposed, the first Faraday rotator disposed in the enclosure, and a first position adjustment mechanism moving the first Faraday material relative to the enclosure. A cross-sectional shape of the first Faraday material in a cross section perpendicular to an optical axis of the light passing through the first Faraday material and a cross-sectional shape of the first magnetic field generation region have major axes in the same direction. The first position adjustment mechanism moves the first Faraday material in the direction of a minor axis perpendicular to the major axis.

18 Claims, 16 Drawing Sheets

(58) Field of Classification Search
CPC ............. H01S 3/08004; H01S 3/08009; H01S 3/10092; H01S 3/225
See application file for complete search history.

(56) References Cited

U.S. PATENT DOCUMENTS

| | | | | |
|---|---|---|---|---|
| 2009/0237771 | A1* | 9/2009 | Nakamura | G02F 1/093 359/280 |
| 2013/0175450 | A1* | 7/2013 | Scherer | G01N 21/3504 250/353 |
| 2014/0346374 | A1* | 11/2014 | Yanagida | G02F 1/093 359/333 |
| 2015/0131149 | A1* | 5/2015 | Watanabe | H01S 3/0064 252/582 |

FOREIGN PATENT DOCUMENTS

| | | | |
|---|---|---|---|
| JP | 2013-218286 | A | 10/2013 |
| JP | 2016-051105 | A | 4/2016 |

OTHER PUBLICATIONS

International Search Report and Written Opinion issued in PCT/JP2021/026593; issued Jan. 16, 2024.

* cited by examiner

OPTICAL ISOLATOR, ULTRAVIOLET LASER APPARATUS, AND ELECTRONIC DEVICE MANUFACTURING METHOD

CROSS-REFERENCE TO RELATED APPLICATIONS

The present application is a continuation application of International Application No. PCT/JP2021/026593, filed on Jul. 15, 2021, the entire contents of which are hereby incorporated by reference.

BACKGROUND

1. Technical Field

The present disclosure relates to an optical isolator, an ultraviolet laser apparatus, and an electronic device manufacturing method.

2. Related Art

In recent years, a semiconductor exposure apparatus is required to improve the resolution thereof as semiconductor integrated circuits are increasingly miniaturized and highly integrated. To this end, reduction in the wavelength of light emitted from a light source for exposure is underway. For example, a KrF excimer laser apparatus, which outputs laser light having a wavelength of about 248 nm, and an ArF excimer laser apparatus, which outputs laser light having a wavelength of about 193 nm, are used as a gas laser apparatus for exposure.

The light from spontaneously oscillating KrF and ArF excimer laser apparatuses has a wide spectral linewidth ranging from 350 to 400 pm. A projection lens made of a material that transmits ultraviolet light, such as the KrF and ArF laser light, therefore undesirably produces chromatic aberrations in some cases. As a result, the resolution of the projection lens may decrease. To avoid the decrease in the resolution, the spectral linewidth of the laser light output from the gas laser apparatus needs to be narrow enough to make the chromatic aberrations negligible. To this end, a line narrowing module (LNM) including a line narrowing element (etalon or grating) is provided in some cases in a laser resonator of the gas laser apparatus to narrow the spectral linewidth. A gas laser apparatus providing a narrowed spectral linewidth is hereinafter referred to as a narrowed-line gas laser apparatus.

CITATION LIST

Patent Literature

[PTL 1] European Patent Application Publication No. 1072938

[PTL 2] JP2007-183419A

SUMMARY

An optical isolator according to an aspect of the present disclosure includes an enclosure, a first polarizer disposed in the enclosure so as to transmit linearly polarized incident light having an ultraviolet wavelength, a first Faraday rotator including a first Faraday material configured to rotate a polarization direction of the light having passed through the first polarizer in a first rotational direction, and a first magnet configured to produce a first magnetic field applied to a first magnetic field generation region where the first Faraday material is disposed, the first Faraday rotator disposed in the enclosure, and a first position adjustment mechanism configured to move the first Faraday material relative to the enclosure, a cross-sectional shape of the first Faraday material in a cross section perpendicular to an optical axis of the light passing through the first Faraday material and a cross-sectional shape of the first magnetic field generation region having major axes in the same direction, and the first position adjustment mechanism moving the first Faraday material in a direction of a minor axis perpendicular to the major axis.

An ultraviolet laser apparatus according to another aspect of the present disclosure includes an oscillation-stage laser configured to output linearly polarized pulse laser light having an ultraviolet wavelength, an amplifier configured to amplify the pulse laser light and output the amplified pulse laser light, and an optical isolator disposed on an optical path between the oscillation-stage laser and the amplifier, the optical isolator including an enclosure, a first polarizer disposed in the enclosure so as to transmit linearly polarized incident light having the ultraviolet wavelength, a first Faraday rotator including a first Faraday material configured to rotate a polarization direction of the pulse laser light having passed through the first polarizer in a first rotational direction, and a first magnet configured to produce a first magnetic field applied to a first magnetic field generation region where the first Faraday material is disposed, the first Faraday rotator disposed in the enclosure, and a first position adjustment mechanism configured to move the first Faraday material relative to the enclosure, a cross-sectional shape of the first Faraday material in a cross section perpendicular to an optical axis of the light passing through the first Faraday material and a cross-sectional shape of the first magnetic field generation region having major axes in the same direction, and the first position adjustment mechanism moving the first Faraday material in a direction of a minor axis perpendicular to the major axis.

An electronic device manufacturing method according to another aspect of the present disclosure and performed by using an ultraviolet laser apparatus including an oscillation-stage laser configured to output linearly polarized pulse laser light having an ultraviolet wavelength, an amplifier configured to amplify the pulse laser light and output the amplified pulse laser light, and an optical isolator disposed on an optical path between the oscillation-stage laser and the amplifier, the optical isolator including an enclosure, a first polarizer disposed in the enclosure so as to transmit linearly polarized incident light having the ultraviolet wavelength, a first Faraday rotator including a first Faraday material configured to rotate a polarization direction of the pulse laser light having passed through the first polarizer in a first rotational direction, and a first magnet configured to produce a first magnetic field applied to a first magnetic field generation region where the first Faraday material is disposed, the first Faraday rotator disposed in the enclosure, and a first position adjustment mechanism configured to move the first Faraday material relative to the enclosure, a cross-sectional shape of the first Faraday material in a cross section perpendicular to an optical axis of the light passing through the first Faraday material and a cross-sectional shape of the first magnetic field generation region having major axes in the same direction, and the first position adjustment mechanism moving the first Faraday material in a direction of a minor axis perpendicular to the major axis, the method includes generating laser light amplified by the amplifier by using the ultraviolet laser apparatus, outputting the amplified laser light to an exposure apparatus, and exposing a photosensitive substrate to the laser light in the exposure apparatus to manufacture electronic devices.

BRIEF DESCRIPTION OF THE DRAWINGS

Embodiments of the present disclosure will be described below only by way of example with reference to the accompanying drawings.

DETAILED DESCRIPTION

Contents

Figure 1:
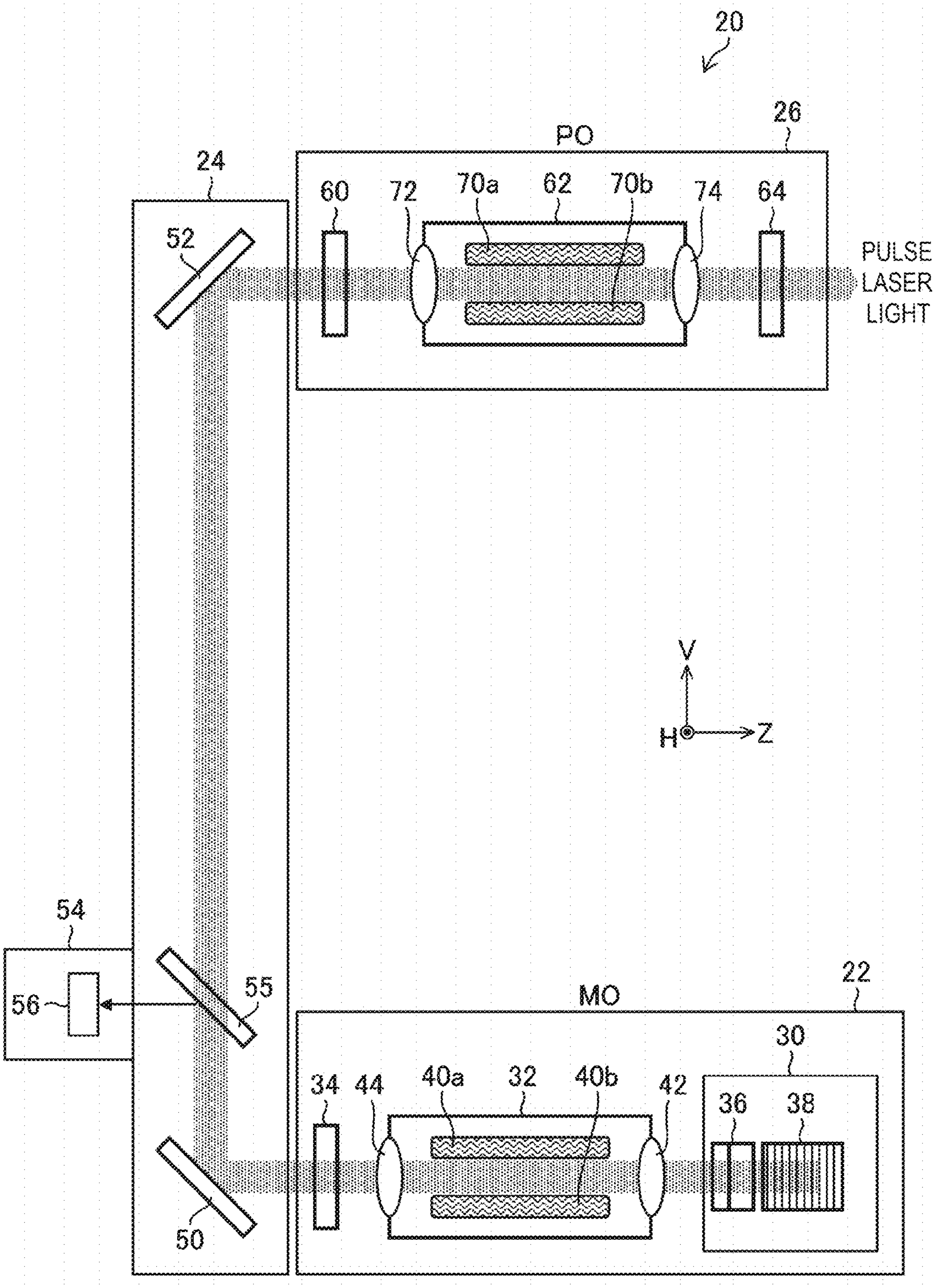
FIG. 1 is a side view schematically showing the configuration of an ultraviolet laser apparatus according to Comparative Example.

1. Description of terms
2. Overview of ultraviolet laser apparatus according to Comparative Example
2.1 Configuration
2.2 Operation
3. Problems
4. First Embodiment
4.1 Configuration
4.2 Operation
4.3 Effects and advantages
4.4 Modification 1
4.5 Modification 2
4.6 Modification 3
4.6.1 Configuration
4.6.2 Operation
4.6.3 Effects and advantages
5. Second Embodiment
5.1 Configuration
5.2 Operation
5.3 Effects and advantages
6. Another example of configuration of ultraviolet laser apparatus
7. Electronic device manufacturing method
8. Others Embodiments of the present disclosure will be described below in detail with reference to the drawings. The embodiments described below show some examples of the present disclosure and are not intended to limit the contents of the present disclosure. Furthermore, all configurations and operations described in the embodiments are not necessarily essential as configurations and operations in the present disclosure. The same component has the same reference character, and no redundant description of the same component will be made.

1. Description of Terms

The term "polarizer" is an optical element that separates light polarized in a specific polarization direction (direction of transmission axis) from light polarized in a direction perpendicular to the specific polarization direction.

The term "parallel" in the present specification is not limited to exactly parallel unless otherwise clearly stated except for a case where it is obvious from the context and includes the concept of approximately parallel including an angular difference range that falls within the technical sense but is practically accepted. The term "perpendicular" or "vertical" in the present specification is also not limited to exactly vertical or perpendicular unless otherwise clearly stated except for a case where it is obvious from the context and includes the concept of approximately perpendicular or vertical including an angular difference range that falls within the technical sense but is practically accepted.

2. Overview of Ultraviolet Laser Apparatus According to Comparative Example

2.1 Configuration

FIG. 1 is a side view schematically showing the configuration of an ultraviolet laser apparatus 20 according to Comparative Example. Comparative Example in the present disclosure is an aspect that the applicant is aware of as known only by the applicant, and is not a publicly known example that the applicant is self-aware of.

The ultraviolet laser apparatus 20 is an excimer laser apparatus including a master oscillator (MO) 22, which is an oscillation-stage laser, an MO beam steering unit 24, and a power oscillator (PO) 26, which is an amplification-stage laser. The MO 22 includes a line narrowing module (LNM) 30, a chamber 32, and an output coupling mirror 34.

The LNM 30 includes a prism expander 36 and a grating 38, which narrow the spectral linewidth. The prism expander 36 and the grating 38 are disposed in the Littrow arrangement, which causes the angle of incidence of the light incident on the grating 38 to be equal to the angle of diffraction of the light diffracted by the grating 38. The output coupling mirror 34 is a partially reflective mirror having a reflectance ranging from 40% to 60%. The output coupling mirror 34 and the LNM 30 are arranged to constitute an optical resonator.

The chamber 32 is disposed on the optical path of the optical resonator. The chamber 32 includes a pair of discharge electrodes 40*a* and 40*b*, and two windows 42 and 44, which transmit the laser light. The chamber 32 is filled with a laser gas. The laser gas contains a rare gas, a halogen gas, and a buffer gas. The rare gas may, for example, be an argon (Ar) or a krypton (Kr) gas. The halogen gas may, for example, be a fluorine ($F_2$) gas. The buffer gas may, for example, be a neon (Ne) gas. A power supply that is not shown applies a voltage to the space between the discharge electrodes 40*a* and 40*b*. The power supply may be a pulse power module (PPM) including a switch and a charging capacitor.

The MO beam steering unit 24 includes highly reflective mirrors 50 and 52 and is so disposed that the laser light output from the MO 22 enters the PO 26.

An MO pulse energy monitor 54 is disposed between the highly reflective mirror 50 and the highly reflective mirror 52. The MO pulse energy monitor 54 includes a beam splitter (BS) 55 and a photosensor 56. The BS 55 is so disposed on the optical path of the pulse laser light output from the MO 22 that the light reflected off the BS 55 is incident on the photosensor 56.

The PO 26 is an amplification-stage laser including a rear mirror 60, a chamber 62, and an output coupling mirror 64. The rear mirror 60 and the output coupling mirror 64 constitute an optical resonator, and the chamber 62 is disposed on the optical path of the optical resonator.

The configuration of the chamber 62 may be the same as that of the chamber 32. The chamber 62 includes a pair of discharge electrodes 70*a* and 70*b*, and two windows 72 and 74. The chamber 62 is filled with a laser gas. The rear mirror 60 may, for example, be a partially reflective mirror having a reflectance ranging from 50% to 90%. The output coupling mirror 64 may be a partially reflective mirror having a reflectance ranging from 10% to 30%.

2.2 Operation

The power supply that is not shown applies high voltage pulses to the space between the discharge electrodes 40*a* and 40*b* in the chamber 32. When discharge occurs between the discharge electrodes 40*a* and 40*b* in the chamber 32, the laser gas is excited, and pulse laser light having ultraviolet wavelengths ranging from 150 nm to 380 nm, which form a narrowed linewidth achieved by the optical resonator including the output coupling mirror 34 and the LNM 30, is output via the output coupling mirror 34.

The energy of the pulse laser light having exited via the output coupling mirror 34 is measured by the MO pulse energy monitor 54. The MO beam steering unit 24 causes the pulse laser light to be incident as seed light on the rear mirror 60 of the PO 26.

At the timing when the seed light having passed through the rear mirror 60 enters the chamber 62, a power supply that is not shown applies high voltage pulses to the space between the discharge electrodes 70*a* and 70*b* in the chamber 62. When discharge occurs between the discharge electrodes 70*a* and 70*b* in the chamber 62, the laser gas is excited, and the seed light is amplified by the Fabry-Perot-type optical resonator including the output coupling mirror 64 and the rear mirror 60, and the amplified pulse laser light is output via the output coupling mirror 64.

3. Problems

Figure 2:
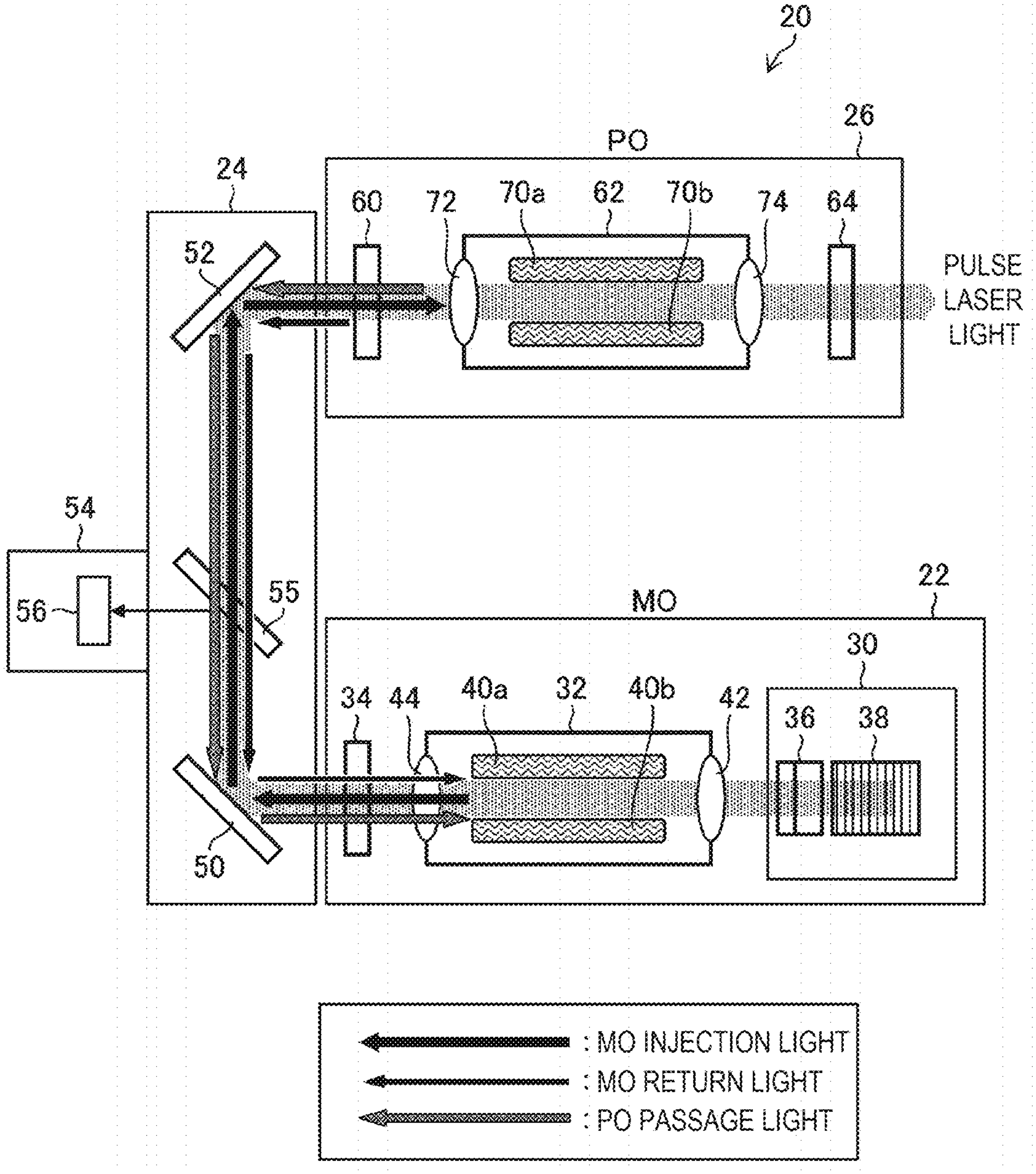
FIG. 2 shows problems with the ultraviolet laser apparatus according to Comparative Example.

FIG. 2 shows problems with the ultraviolet laser apparatus 20 according to Comparative Example. Part of the pulse laser light output from the MO 22 forms light returning from the PO 26 (return light), and the return light from the PO 26, if returning to the MO 22, causes deterioration of the laser performance. The "return light" used herein includes two types of light, MO return light and PO passage light. The light having exited out of the MO 22 enters the PO 26, and part of the light incident on the rear mirror 60 does not travel toward the interior of the PO 26 but returns directly toward the MO 22 because the rear mirror 60 in the PO 26 is a partially reflective mirror (having reflectance ranging from 50% to 90%). The light that does not travel into the chamber 62 of the PO 26 but is reflected off the rear mirror 60 and returns toward the MO 22 is called "MO return light".

On the other hand, the light having entered the PO 26 from the MO 22 and passed through the rear mirror 60 is caused to resonate and amplified in the PO 26 and output therefrom. As described above, since the rear mirror 60 in the PO 26 is a partially reflective mirror, part of the light having entered the chamber 62 of the PO 26 and having been amplified therein undesirably returns to the MO 22. The light amplified in the PO 26, passing through the rear mirror 60, and returning to the MO 22 is called "PO passage light".

The return light from the PO 26 becomes a heat load on the LNM 30 and other components and may cause deterioration in the linewidth stability, pulse energy stability, and other factors. To suppress the return light that enters the MO 22, it is conceivable to dispose an optical isolator between the MO 22 and the PO 26.

Figure 3:
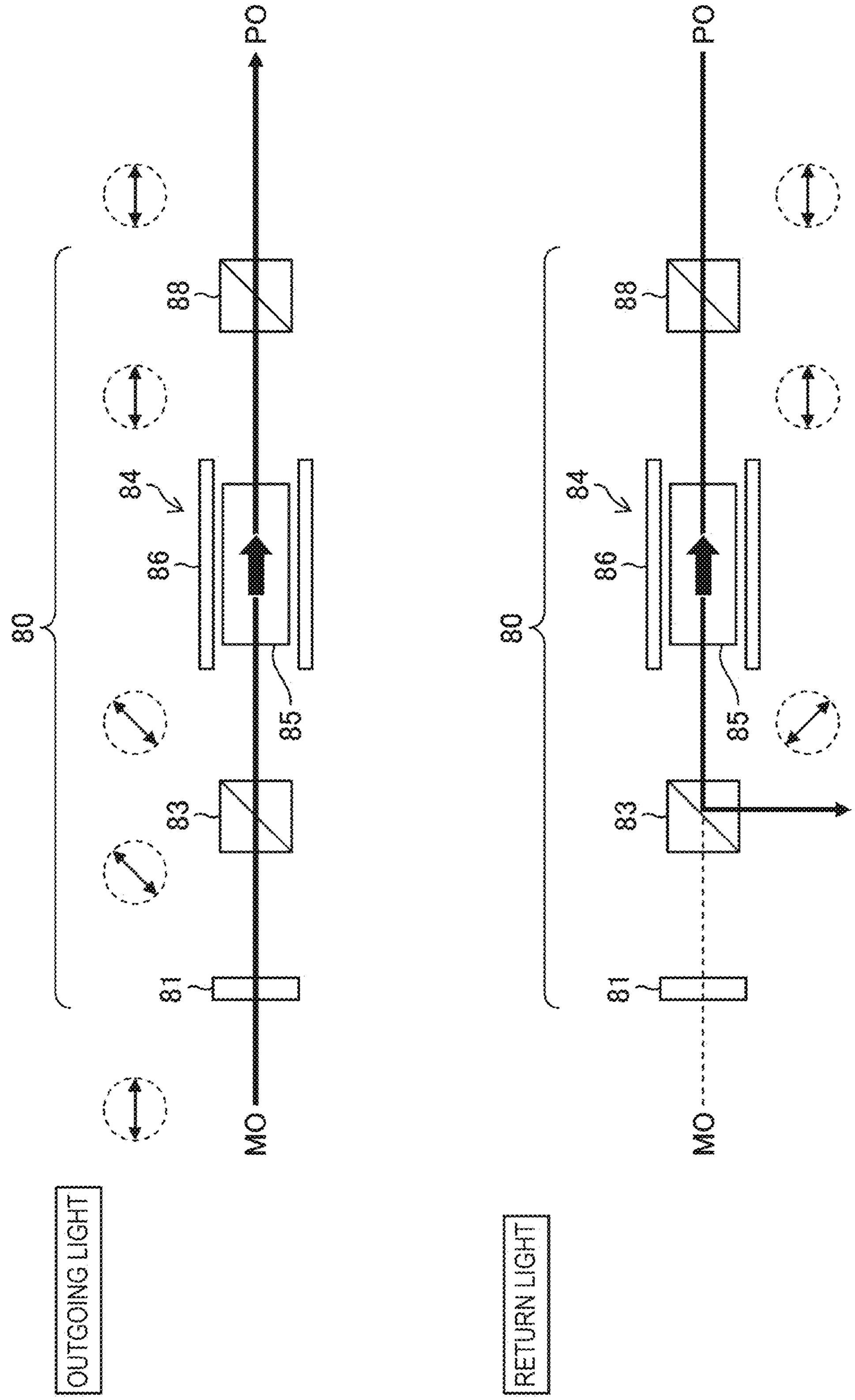
FIG. 3 schematically shows the configuration of an optical isolator according to Comparative Example, which suppresses return light.

FIG. 3 schematically shows an example of the configuration of an optical isolator 80 according to Comparative Example, which suppresses the return light. The optical isolator 80 is disposed between the MO 22 and the PO 26. The upper portion of FIG. 3 shows how the optical isolator 80 affects the pulse laser light traveling from the MO 22 toward the PO 26 (MO injection light: outgoing light). The lower portion of FIG. 3 shows how the optical isolator 80 affects the laser light traveling from the PO 26 toward the MO 22 (return light).

The optical isolator 80 includes a half-wave plate 81, a first polarizer 83, a Faraday rotator 84, and a second polarizer 88 arranged in this order from the side facing the MO 22. The Faraday rotator 84 includes a Faraday material 85 and a magnet 86. The magnet 86 has a hollow structure, which houses the Faraday material 85 via an inner holder. The internal space (hollow portion) of the magnet 86 in which the Faraday material 85 is disposed is a magnetic field generation region where a magnetic field to be applied to the Faraday material 85 is generated. The magnet 86 may be a permanent magnet. In FIG. 3, the rightward arrow shown in the Faraday rotator 84 represents the direction of the magnetic field produced by the magnet 86 and applied to the Faraday material 85. A double-headed arrow shown in each broken-line circle in FIG. 3 represents the direction of the polarization plane, that is, the polarization direction of the pulse laser light viewed in the traveling direction of the pulse laser light.

As shown in the upper portion of FIG. 3, linearly polarized pulse laser light polarized in a specific direction (horizontal direction by way of example in the description) is output from the MO 22. The half-wave plate 81 rotates the polarization direction of the linearly polarized pulse laser light output from the MO 22 by 45 degrees in the counterclockwise direction. The first polarizer 83 has a transmission axis parallel to the polarization direction of the pulse laser light output from the half-wave plate 81, so that the pulse laser light output from the half-wave plate 81 passes through the first polarizer 83.

The polarization direction of the pulse laser light having passed through the first polarizer 83 is rotated by the Faraday material 85, to which the magnetic field is applied, by 45 degrees in the clockwise direction. The pulse laser light output from the Faraday rotator 84 is thus horizontally polarized. The second polarizer 88 has a transmission axis parallel to the polarization direction of the pulse laser light output from the Faraday rotator 84, so that the pulse laser light output from the Faraday rotator 84 passes through the second polarizer 88 and then enters the PO 26.

The half-wave plate 81 adjusts the polarization direction of the pulse laser light from the MO 22 in such a way that the polarization direction of the pulse laser light output from the MO 22 coincides with the polarization direction of the pulse laser light that enters the PO 26. The polarization direction of the pulse laser light thus does not change before and after the optical isolator 80 even when the optical isolator 80 is disposed.

Out of the return light, the polarization component having the same polarization direction as that of the pulse laser light that enters the PO 26 passes through the second polarizer 88, and is rotated by the Faraday material 85, to which the magnetic field is applied, by 45 degrees in the clockwise direction. The return light is then reflected off the first polarizer 83 and does not therefore enter the MO22.

Out of the return light, the polarization components having the polarization directions different from that of the pulse laser light that enters the PO 26 are reflected off the second polarizer 88 and do not therefore return to the MO22. The second polarizer 88 is disposed to remove the disturbed polarization components when the polarization of the return light from the PO 26 is disturbed to achieve the effect of the optical isolator 80 by a greater degree. The second polarizer 88 may not therefore be used when the polarization of the return light is not disturbed or when even the disturbed return light provides a sufficient extinction ratio.

The extinction ratio is the ratio of the return light passing through the first polarizer 83 to the return light that enters the second polarizer 88.

Figure 4:
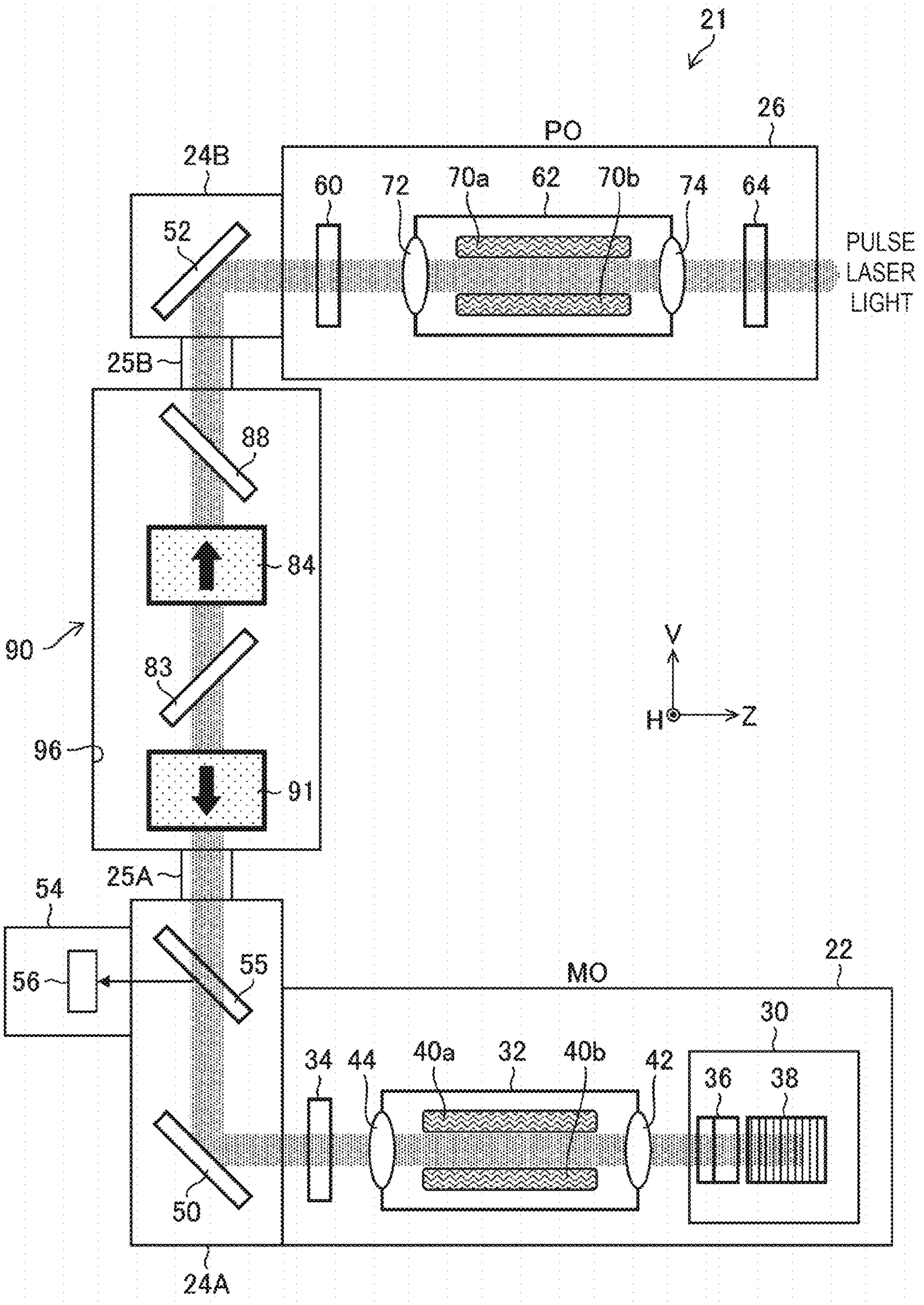
FIG. 4 schematically shows the configuration of an ultraviolet laser apparatus including an optical isolator.

FIG. 4 schematically shows the configuration of an ultraviolet laser apparatus 21 including an optical isolator 90. Differences in configuration between FIG. 4 and FIGS. 1 to 3 will be described. The ultraviolet laser apparatus 21 shown in FIG. 4 has a configuration in which the optical isolator 90 is disposed between an MO beam steering unit 24A and an MO beam steering unit 24B to suppress the return light.

In the optical isolator 90, a Faraday rotator 91 is disposed in place of the half-wave plate 81 in FIG. 3. The reason for this is that the Faraday material of which the Faraday rotator 91 is made has higher resistance to laser light having ultraviolet wavelengths than the half-wave plate 81 does. Note that the function of the Faraday rotator 91 is the same as that of the half-wave plate 81.

The Faraday rotator 91 has the same structure as that of the Faraday rotator 84 and includes a Faraday material FM and a magnet MG, none of which is shown. In FIG. 4, the downward arrow shown in the Faraday rotator 91 represents the direction of the magnetic field applied to the Faraday material FM. The direction of the magnetic field applied by the magnet MG of the Faraday rotator 91 to the Faraday material FM is opposite to the direction of the magnetic field applied to the Faraday material 85 of the Faraday rotator 84.

The optical isolator 90 includes an isolator enclosure 96, in which the Faraday rotator 91, the first polarizer 83, the Faraday rotator 84, and the second polarizer 88 are disposed.

The MO beam steering unit 24A includes the highly reflective mirror 50 and the beam splitter 55. The MO beam steering unit 24B includes the highly reflective mirror 52. The isolator enclosure 96 is connected to the enclosure of the MO beam steering unit 24A via bellows 25A, and is connected to the enclosure of the MO beam steering unit 24B via bellows 25B.

The optical isolator 90 needs to be so disposed that the pulse laser light passes through the Faraday material FM, the first polarizer 83, the Faraday material 85, and the second polarizer 88. On the other hand, the optical axis of the pulse laser light extending from the MO 22 toward the PO 26 varies from apparatus to apparatus. To handle the situation described above, the Faraday material FM large enough as compared with the cross section (beam cross section) of the pulse laser light, the first polarizer 83, the Faraday material 85, and the second polarizer 88 are disposed in the optical isolator 90.

However, an increase in the sizes of the Faraday materials FM and 85 increases the sizes of the magnets MG and 86, which apply uniform magnetic fields thereto. Since the magnets MG and 86 are each heavy, the optical isolator 90, in which the two magnets MG and 86 are disposed, is heavy and has poor maintainability.

The problem described above is not limited to the optical isolator 90 shown in FIG. 4, and the same holds true for the optical isolator 80 using the half-wave plate 81 shown in FIG. 3, that is, an increase in the size of the Faraday material 85 increases the size of the magnet 86, resulting in poor maintainability.

4. First Embodiment

4.1 Configuration

Figure 5:
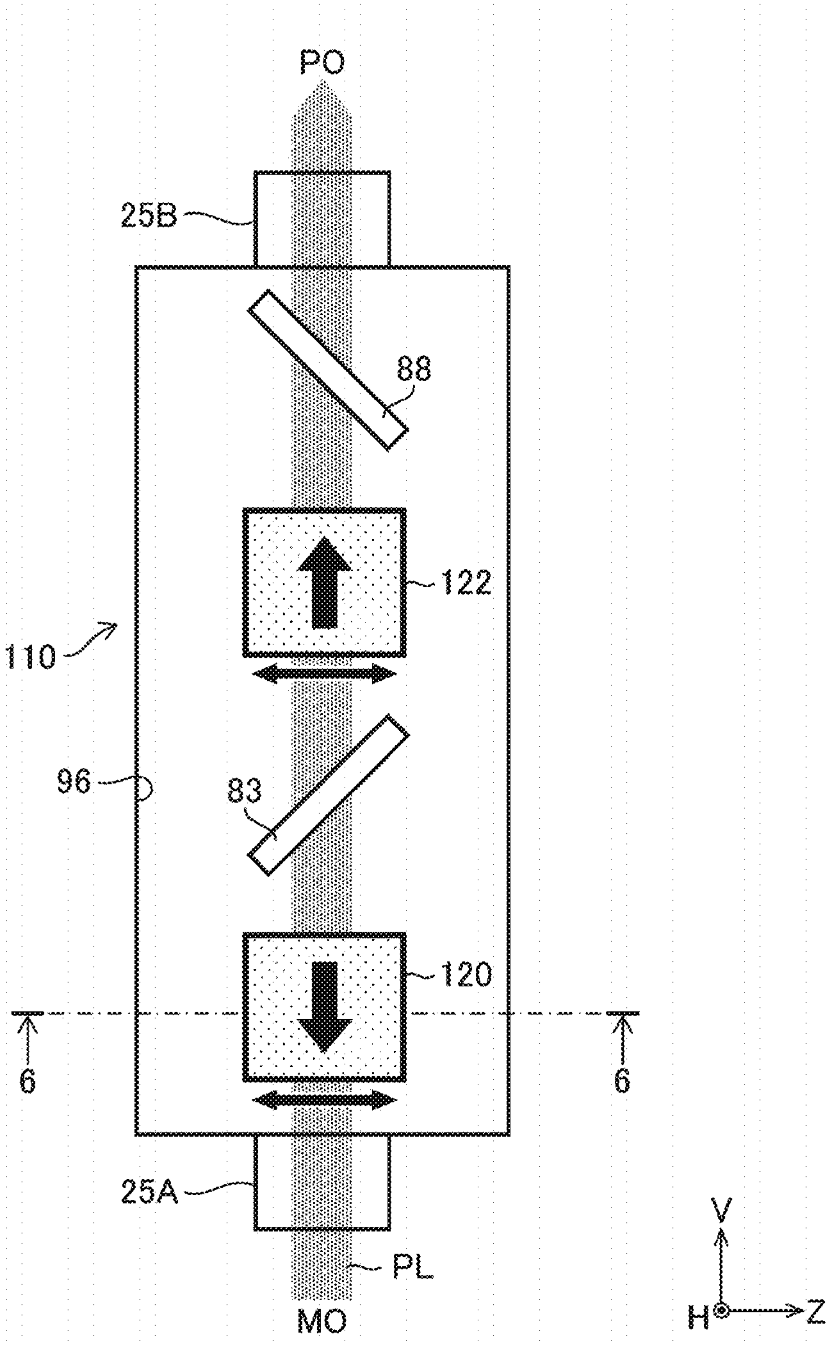
FIG. 5 schematically shows the configuration of an optical isolator according to a first embodiment.
Figure 6:
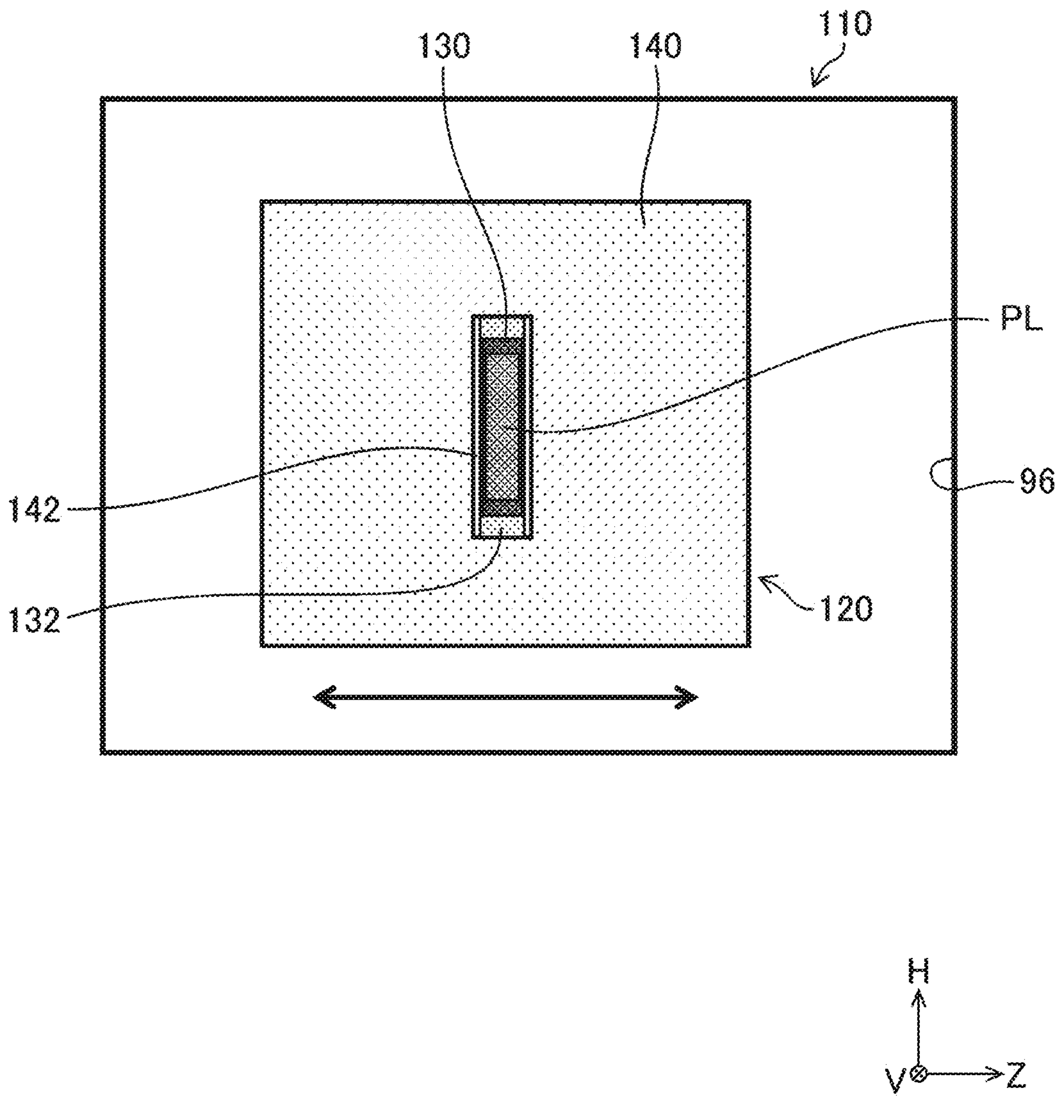
FIG. 6 is a cross-sectional view taken along the line 6-6 in FIG. 5.

FIG. 5 schematically shows the configuration of an optical isolator 110 according to a first embodiment. FIG. 6 is a cross-sectional view taken along the line 6-6 in FIG. 5. The configuration shown in FIGS. 5 and 6 will be described in terms of points different from that of the optical isolator 90 shown in FIG. 4. In the following description, unless otherwise specified, the term “cross section” or “cross-sectional shape” refers to a cross section perpendicular to the optical axis of pulse laser light PL or the shape of the cross section, as shown in FIG. 6. In FIGS. 5 and 6, the traveling direction of the pulse laser light PL is parallel to the direction of a V axis (V direction), and the cross section shown in FIG. 6 is a plane HZ parallel to an H axis and a Z axis.

The optical isolator 110 includes Faraday rotators 120 and 122 in place of the Faraday rotators 91 and 84 in FIG. 4. The Faraday rotator 120 is disposed at the side closer to the MO 22 than the first polarizer 83, that is, at the light incident side of the first polarizer 83 on the optical path of the pulse laser light PL output from the MO 22 toward the PO 26. The Faraday rotator 120 includes a Faraday material 130 and a magnet 140.

The smaller the cross-sectional shape of a magnetic field generation region 142, where the Faraday material 130 is disposed, the smaller the magnet 140 of the Faraday rotator 120 can be. The pulse laser light PL output from the MO 22 has a cross-sectional shape having a major axis (rectangular shape, for example), so that the magnetic field generation region 142 having a cross-sectional shape having a major axis and a minor axis perpendicular to and shorter than the major axis is more effective in reducing the size of the magnet 140.

Therefore, in the optical isolator 110, the Faraday material 130 has a cross-sectional shape having a major axis in the same direction as the direction of the major axis of the cross-sectional shape of the pulse laser light PL, and having a shortest possible minor axis. Furthermore, the magnetic field generation region 142 of the magnet 140 has a cross-sectional shape having a major axis in the same direction as the direction of the major axis of the cross-sectional shape of the Faraday material 130 in accordance with the cross-sectional shape of the Faraday material 130.

Thereafter, to handle a case where the optical axis of the pulse laser light PL deviates from a design value, the optical isolator 110 accommodates a position adjustment mechanism that adjusts the position of the Faraday material 130 by moving the Faraday material 130 in the direction parallel to the minor axis (minor-axis direction). An example of the configuration of the position adjustment mechanism will be described later with reference to FIGS. 8 and 9. The position adjustment mechanism is a mechanism that moves the Faraday rotator 120 relative to the isolator enclosure 96. A double-headed arrow parallel to the Z direction in FIGS. 5 and 6 represents the direction in which the position adjustment mechanism moves the Faraday rotator 120.

The position adjustment mechanism may move the first polarizer 83 as well as the Faraday rotator 120. That is, the Faraday material 130 and the first polarizer 83 may be integrated with each other into an integral structure, and the Faraday material 130 and the first polarizer 83 may be moved as an integral part by the position adjustment mechanism.

The optical isolator 110 may further include a rotational mechanism that rotates the Faraday material 130 around the axis perpendicular to the optical axis of the pulse laser light PL and the direction of the minor axis of the Faraday material 130. An example of the configuration of the rotational mechanism will be described later with reference to FIGS. 8 and 9.

Figure 7:
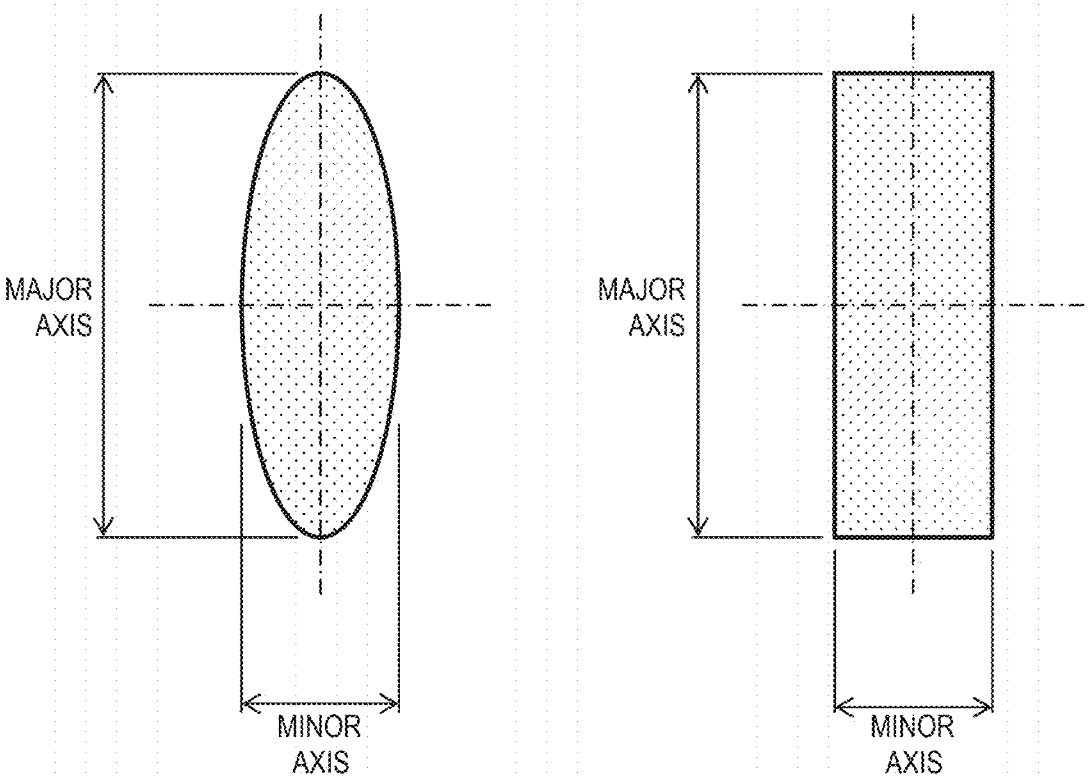
FIG. 7 shows examples of the shape having a major axis.

FIG. 7 shows examples of the shape having a major axis. The shape having a major axis means an elongated shape having a major axis and a minor axis, with the length in a first direction that is the direction of the major axis being longer than the length in a second direction that is the direction of the minor axis perpendicular to the first direction. The shape having a major axis includes, for example, ellipses and rectangles. An ellipse has a major axis and a minor axis, as shown in the left portion of FIG. 7. In the case of a rectangle, a long side and a short side are defined as the major axis and the minor axis, respectively, as shown in the right portion of FIG. 7. The first embodiment will be described with reference to a configuration in which the pulse laser light PL has a rectangular cross-sectional shape (beam cross section), the major axis extending in the H direction, and the minor axis extending in the Z direction. The shape having a major axis further includes a shape as a result of connecting two circles having the same radius to each other with outer tangent lines common to the two circles (ellipse), and a rectangular shape having rounded four corners (rounded rectangle).

Figure 8:
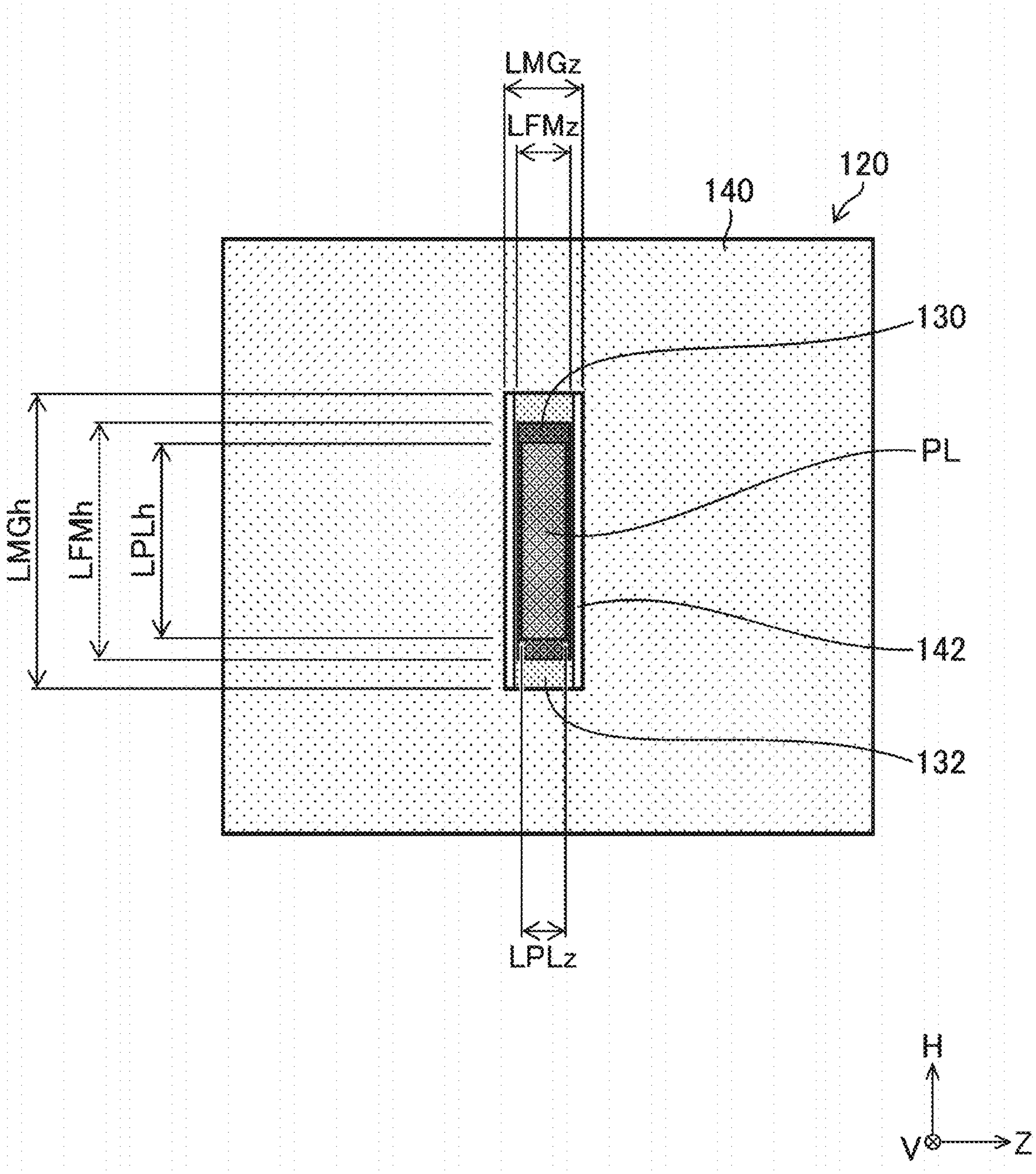
FIG. 8 schematically shows the cross-sectional shape of a cross section of a Faraday rotator perpendicular to an optical axis thereof.

FIG. 8 schematically shows the cross-sectional shape of the Faraday rotator 120. The Faraday material 130 is disposed in the magnetic field generation region 142 of the magnet 140 with the Faraday material 130 held in a Faraday material holder 132. The direction of the magnetic field passing through the Faraday material 130 is parallel to the light propagation direction. The direction in which the Faraday rotator 120 rotates the polarization plane (polarization direction) depends on the sign of the Verdet constant and the direction of the applied magnetic field.

The Faraday material 130 has a cross-sectional shape having a major axis in the same direction as the direction of the major axis of the cross-sectional shape of the pulse laser light PL, and larger than the cross-sectional shape of the pulse laser light PL. The Faraday material 130 shown in FIG. 8 has a rectangular cross-sectional shape having a major axis extending in the H direction, with a length LFMz of the minor axis of the Faraday material 130 longer than a length LPLz of the minor axis of the cross-sectional shape of the pulse laser light PL, and a length LFMh of the major axis of the Faraday material 130 longer than a length LPLh of the major axis of the cross-sectional shape of the pulse laser light PL.

The difference (LFMz-LPLz) between the length LFMz of the minor axis of the Faraday material 130 and the length LPLz of the minor axis of the pulse laser light PL may, for example, range from about 2 to 4 mm. The difference (LFMh-LPLh) between the length LFMh of the major axis of the Faraday material 130 and the length LPLh of the major axis of the pulse laser light PL may, for example, range from about 3 to 5 mm. Since the Faraday material 130 is movable in the direction of the minor axis, the difference in the length of the minor axis (LFMz-LPLz) may be smaller than the difference in the length of the major axis (LFMh-LPLh).

The magnetic field generation region 142, where the Faraday material 130 is disposed, has a cross-sectional shape having a major axis in the same direction as the direction of the major axis of the cross-sectional shape of the Faraday material 130. The magnetic field generation region 142 shown in FIG. 8 has a rectangular cross-sectional shape having a major axis oriented in the H direction. From the viewpoint of the reduction in the size of the magnet 140, it is desirable that a length LMGz of the minor axis of the magnetic field generation region 142 is greater than or equal to the length LFMz of the minor axis of the Faraday material 130 but is as short as possible. For example, the difference between LMGz and LFMz (LMGz-LFMz) is preferably smaller than or equal to 2 mm, more preferably, smaller than or equal to 1 mm.

A length LMGh of the major axis of the magnetic field generation region 142 is greater than or equal to the length LFMh of the major axis of the Faraday material 130, and actually greater than or equal to the length of the Faraday material holder 132 in the H direction. The difference (LMGh-LFMh) between the length LMGh of the major axis of the magnetic field generation region 142 and the length LFMh of the major axis of the Faraday material 130 may be greater than the difference (LMGz-LFMz) between LMGz and LFMz in the direction of the minor axis.

As a specific example of the dimensions, for example, when the length LPLz of the minor axis of the cross section of the pulse laser light PL is 2 mm and the length LPLh of the major axis is 12 mm, it is preferable that the length LFMz of the minor axis of the Faraday material 130 ranges from 4 mm to 6 mm, and that the length LFMh of the major axis of the Faraday material 130 ranges from 15 mm to 17 mm. In this case, it is preferable that the length LMGz of the minor axis of the magnetic field generation region 142 ranges from 4 mm to 7 mm, and that the length LMGh of the major axis of the magnetic field generation region 142 is greater than or equal to 17 mm.

The Faraday rotator 122 may also have the same configuration as that of the Faraday rotator 120. The Faraday material 130, the Faraday material holder 132, the magnet 140, and the magnetic field generation region 142 shown in FIG. 8 may be replaced with and taken as the Faraday material, the Faraday material holder, the magnet, and the magnetic field generation region of the Faraday rotator 122.

Figure 9:
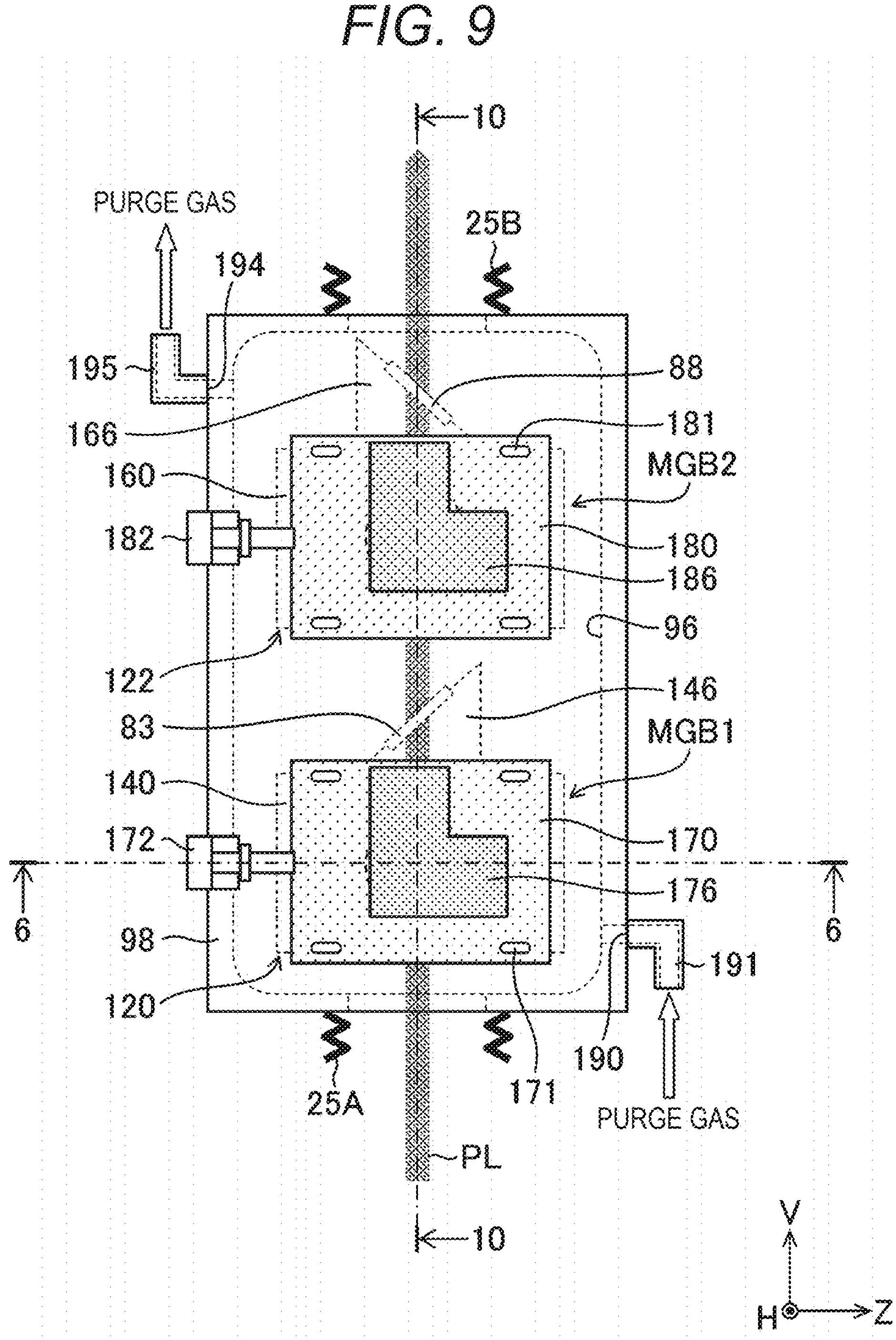
FIG. 9 shows an example of the specific configuration of the optical isolator according to the first embodiment.
Figure 10:
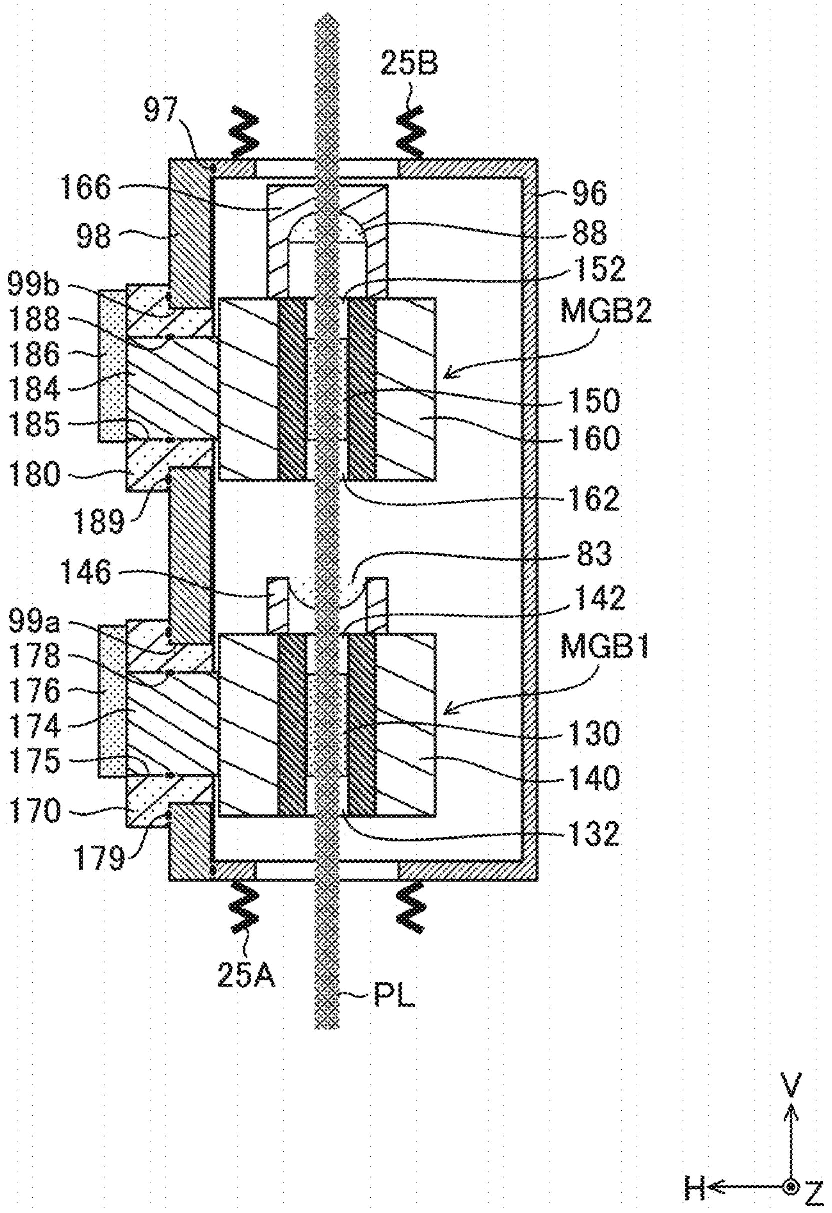
FIG. 10 is a cross-sectional view taken along the line 10-10 in FIG. 9.

FIGS. 9 and 10 show an example of the specific configuration of the optical isolator 110. FIG. 10 is a cross-sectional view taken along the line 10-10 in FIG. 9.

The Faraday material 130, the Faraday material holder 132, and the magnet 140 of the Faraday rotator 120; a polarizer holder 146; and the first polarizer 83 constitute a magnet block MGB1 in the form of an integral structure. Out of the members that constitute the magnet block MGB1, the members excluding the magnet 140 are made of non-magnetic materials. The non-magnetic materials may, for example, be copper-based, aluminum-based, and austenitic stainless steel. The first polarizer 83 is integrated with the Faraday rotator 120 with the first polarizer 83 held by the polarizer holder 146. The Faraday material 130 is disposed in the magnetic field generation region 142 of the magnet 140 with the Faraday material 130 held by the Faraday material holder 132.

Similarly, a Faraday material 150, a Faraday material holder 152, and a magnet 160 of the Faraday rotator 122; a polarizer holder 166; and the second polarizer 88 constitute a magnet block MGB2 in the form of an integral structure. Out of the members that constitute the magnet block MGB2, the members excluding the magnet 160 are made of non-magnetic materials. The second polarizer 88 is integrated with the Faraday rotator 122 with the second polarizer 88 held by the polarizer holder 166. The Faraday material 150 is disposed in a magnetic field generation region 162 of the magnet 160 with the Faraday material 150 held by the Faraday material holder 152.

The magnet block MGB1 and the magnet block MGB2 are disposed in the sealable isolator enclosure 96. The surface having an opening of the isolator enclosure 96 that opens in the H direction is covered with an isolator lid 98. The interface between the isolator enclosure 96 and the isolator lid 98 is sealed with an O-ring 97. The isolator lid 98 has through holes 99*a* and 99*b*; a slide plate 170 is inserted into the through hole 99*a*, and a slide plate 180 is inserted into the through hole 99*b*. The through holes 99*a* and 99*b* are elongated in the Z direction, and the slide plate 170 is fixed to the isolator lid 98 so as to be slidable in the Z direction along the through hole 99*a*. Through holes 171, through which fixing screws that are not shown pass, are formed, for example, at the four corners of the slide plate 170, and the fixing screws fix the slide plate 170 to the isolator lid 98. The through holes 171 may also each be an oval elongated in the Z direction. The isolator lid 98 is provided with a direction-Z adjustment screw 172, which causes the slide plate 170 to slide in the Z direction.

The magnet block MGB1 is supported by the slide plate 170 via a shaft 174, as shown in FIG. 10. That is, the magnet block MGB1 is fixed to one end of the shaft 174, and the shaft 174 is inserted into a through hole 175 of the slide plate 170. The shaft 174 has a cylindrical shape and is rotatable around an axis of rotation parallel to the H direction. A handle 176 is fixed to the other end of the shaft 174, and the handle 176 rotates around the axis of rotation of the shaft 174 and is fixed to the slide plate 170.

The interface between the shaft 174 and the slide plate 170 is sealed with an O-ring 178, and the interface between the slide plate 170 and the isolator lid 98 is sealed with an O-ring 179.

The configurations of the magnet block MGB2, the slide plate 180, a shaft 184, a through-hole 185, and a handle 186 are the same, for example, as the magnet block MGB1 and the like. The slide plate 180 is fixed to the isolator lid 98 so as to be slidable in the Z direction along the through hole 99*b*. Through holes 181 of the slide plate 180 may each be a hole elongated in the Z direction, and the isolator lid 98 is provided with a direction-Z adjustment screw 182, which causes the slide plate 180 to slide in the Z direction.

The interface between the shaft 184 and the slide plate 180 is sealed with an O-ring 188, and the interface between the slide plate 180 and the isolator lid 98 is sealed with an O-ring 189.

The Faraday materials 130 and 150 may, for example, be calcium fluoride ($CaF_2$) crystal.

The isolator enclosure 96 is provided with an inlet 190 and an introduction port 191, via which a purge gas is introduced into the isolator enclosure 96, and an outlet 194 and an exhaust port 195, via which the purge gas is exhausted out of the isolator enclosure 96.

4.2 Operation

The Faraday material 130, the first polarizer 83, the Faraday material 150, and the second polarizer 88 are disposed at design positions in the isolator enclosure 96 of the optical isolator 110.

The optical isolator 110 is positioned by a positioning pin that is not shown and disposed at a frame that is not shown but is a portion of the ultraviolet laser apparatus 21.

An example of an adjustment procedure after the optical isolator 110 is disposed in the ultraviolet laser apparatus 21 is shown below.

[Step 1] A photosensor PS that is not shown, such as a power meter, is attached to the location of the bellows 25B.

[Step 2] The MO 22 is caused to perform laser oscillation and the direction-Z adjustment screw 172 is turned to move the magnet block MGB1, the shaft 174, the slide plate 170, and the handle 176 in the Z direction, and fixed at a position where the power detected by the photosensor PS is maximized.

[Step 3] In addition to adjustment of the position in the Z direction in step 2, the handle 176 may further be turned around an axis parallel to the H axis and fixed at a position where the power detected by the photosensor PS is maximized.

[Step 4] The magnet block MGB2 is adjusted in the same manner.

[Step 5] Thereafter, the photosensor PS is removed, and the bellows 25B is installed.

[Step 6] A purge gas may be introduced into the isolator enclosure 96 through the inlet 190 via the introduction port 191 and exhausted via the exhaust port 195 through the outlet 194. Instead, the purge gas may be introduced through the bellows 25A and exhausted through the bellows 25B with none of the inlet 190, the introduction port 191, the outlet 194, and the exhaust port 195 provided. The purge gas may be caused to flow in the direction opposite to the direction described above. The purge gas may, for example, be nitrogen. The nitrogen is an example of the “gas” in the present disclosure. The bellows 25A and 25B can be an example of the “inlet” and the “outlet” in the present disclosure.

The function of the Faraday rotator 120 is the same as that of the half-wave plate 81 in FIG. 3. The function of the Faraday rotator 122 is the same as that of the Faraday rotator 84 in FIG. 3. The isolator enclosure 96 and the isolator lid 98 are examples of the “enclosure” in the present disclosure. The pulse laser light PL that passes through the Faraday rotator 122 and enters the first polarizer 83 is an example of the “incident light” in the present disclosure. The Faraday rotator 122 is an example of the “first Faraday rotator” in the present disclosure, and the Faraday material 150, the magnet 160, and the magnetic field generation region 162 are examples of the “first Faraday material”, the “first magnet”, and the “first magnetic field generation region” in the present disclosure. The magnetic field generated by the magnet 160 in the magnetic field generation region 162 is an example of the "first magnetic field" in the present disclosure.

The position adjustment mechanism that includes the slide plate 180 and the direction-Z adjustment screw 182 and moves the magnet block MGB2 in the Z direction is an example of the "first position adjustment mechanism" in the present disclosure. The slide plate 180 is an example of the "first slide plate" in the present disclosure, and the direction-Z adjustment screw 182 is an example of the "first adjustment screw" in the present disclosure. The rotational mechanism that includes the shaft 184 and the handle 186 and rotates the magnet block MGB2 around an axis of rotation parallel to the H direction is an example of the "first rotational mechanism" in the present disclosure. The shaft 184 is an example of the "first shaft" in the present disclosure. The rotational direction (clockwise direction in FIG. 3) in which the polarization direction of the pulse laser light PL having passed through the first polarizer 83 is rotated by 45 degrees when the pulse laser light PL passes through the Faraday rotator 122 is an example of the "first rotational direction" in the present disclosure.

The Faraday rotator 120 is an example of the "second Faraday rotator" in the present disclosure, and the Faraday material 130, the magnet 140, and the magnetic field generation region 142 are examples of the "second Faraday material", the "second magnet", and the "second magnetic field generation region" in the present disclosure. The magnetic field generated by the magnet 140 in the magnetic field generation region 142 is an example of the "second magnetic field" in the present disclosure.

The position adjustment mechanism that includes the slide plate 170 and the direction-Z adjustment screw 172 and moves the magnet block MGB1 in the Z direction is an example of the "second position adjustment mechanism" in the present disclosure. The slide plate 170 is an example of the "second slide plate" in the present disclosure, and the direction-Z adjustment screw 172 is an example of the "second adjustment screw" in the present disclosure. The rotational mechanism that includes the shaft 174 and the handle 176 and rotates the magnet block MGB1 around an axis of rotation parallel to the H direction is an example of the "second rotational mechanism" in the present disclosure. The shaft 174 is an example of the "second shaft" in the present disclosure. The rotational direction (counterclockwise direction in FIG. 3) in which the polarization direction of the pulse laser light PL output from the MO 22 is rotated by 45 degrees when the pulse laser light PL passes through the Faraday rotator 120 is an example of the "second rotational direction" in the present disclosure.

4.3 Effects and Advantages

The optical isolator 110 according to the first embodiment employs the configuration in which the Faraday materials 130 and 150 each have a cross-sectional shape having a major axis and a shortest possible minor axis, and the magnetic field generation regions 142 and 162 of the magnets 140 and 160 each accordingly have a cross-sectional shape having a major axis in the same direction as that of the Faraday material, so that the sizes of the magnets 140 and 160 can be efficiently reduced.

In the optical isolator 110 according to the first embodiment, when the optical axis of the pulse laser light PL traveling from the MO 22 toward the PO 26 deviates from a design value, the position adjustment mechanism including the direction-Z adjustment screws 172 and 182 can adjust the pulse laser light PL in such a way that the pulse laser light PL passes through the Faraday materials 130 and 150.

Reducing the sizes of the magnets 140 and 160 reduces the weight of the optical isolator 110 accordingly, so that the maintainability thereof is improved.

4.4 Modification 1

Figure 11:
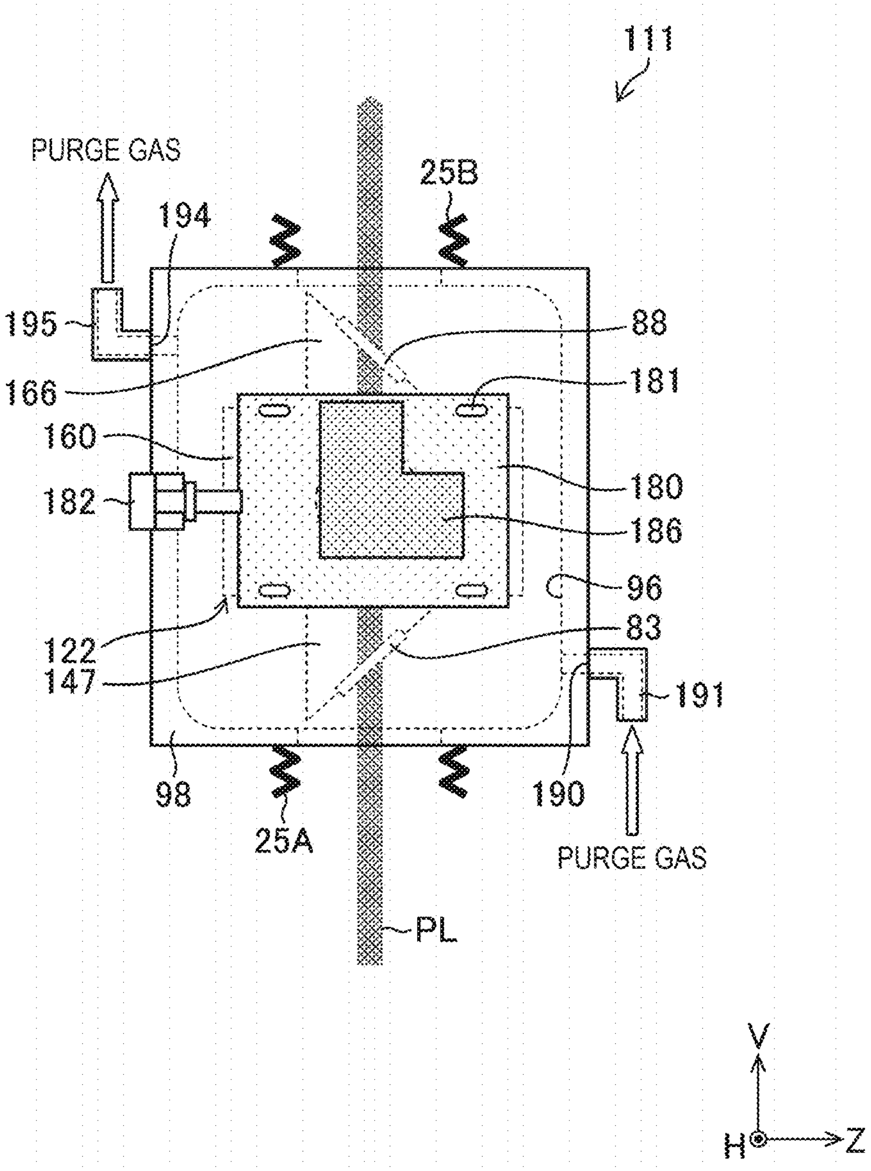
FIG. 11 schematically shows the configuration of an optical isolator according to Modification 1.

FIG. 11 schematically shows the configuration of an optical isolator 111 according to Modification 1. The optical isolator 111 in FIG. 11 may be employed in place of the optical isolator 110 described with reference to FIGS. 5 to 10. Differences in configuration between FIGS. 11 and 9 will be described.

When it is not necessary to adjust the polarization direction of the pulse laser light PL output from the MO 22 to be the same as the polarization direction of the pulse laser light PL incident on the PO 26, the Faraday rotator 120 may not be disposed, and the optical isolator 111 shown in FIG. 11 can be used. The optical isolator 111 is not provided with the Faraday rotator 120, and is further not provided with a position adjustment mechanism that moves the Faraday rotator 120, such as the slide plate 170 and the direction-Z adjustment screw 172.

In the optical isolator 111, the first polarizer 83; a polarizer holder 147; the Faraday material 150, the Faraday material holder 152, and the magnet 160 of the Faraday rotator 122; the polarizer holder 166; and the second polarizer 88 constitute the magnet block MGB2 in the form an integral structure.

The first polarizer 83 held by the polarizer holder 147 is integrated with the Faraday rotator 122. The other configurations may be the same as those of the optical isolator 110 according to the first embodiment.

4.5 Modification 2

Figure 12:
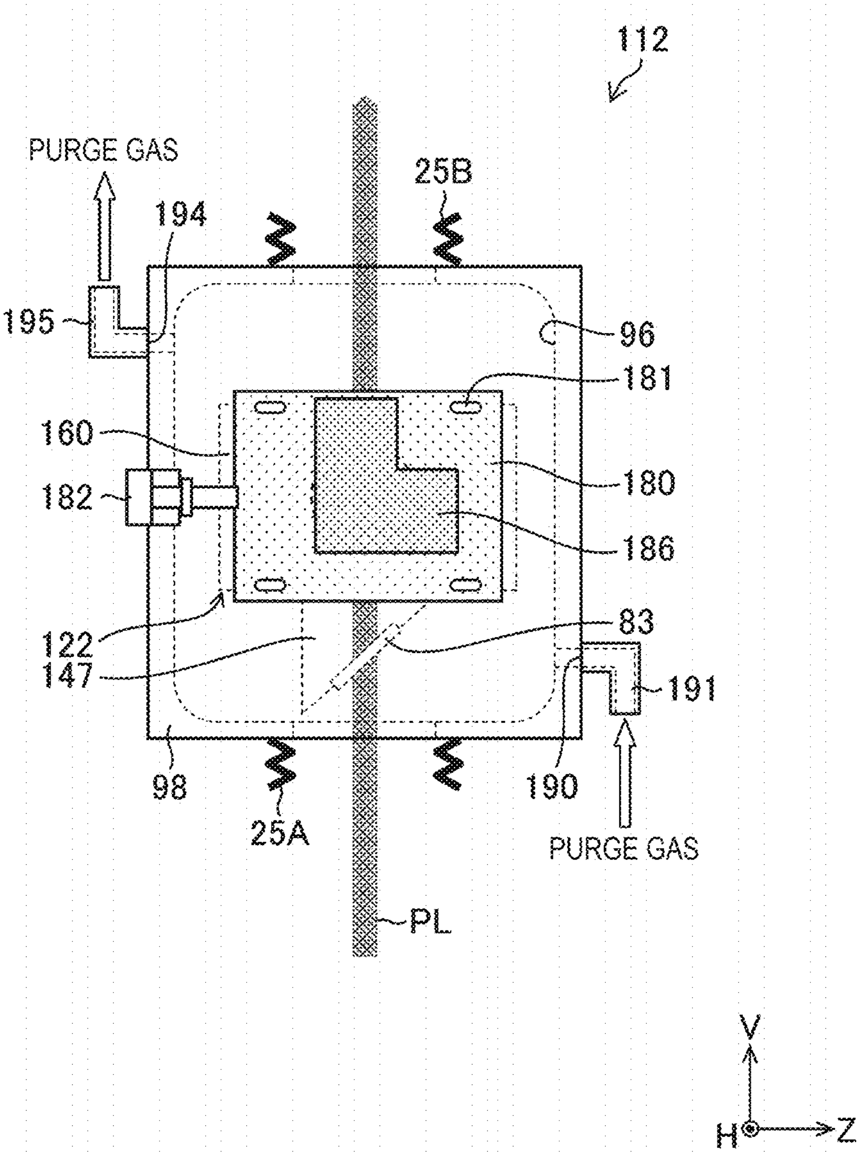
FIG. 12 schematically shows the configuration of an optical isolator according to Modification 2.

FIG. 12 schematically shows the configuration of an optical isolator 112 according to Modification 2. When the polarization of the return light is not disturbed or when even the disturbed return light provides a sufficient extinction ratio, the second polarizer 88 may not be disposed, and the optical isolator 112 shown in FIG. 12 may be employed in place of the optical isolator 111 in FIG. 11. Differences in configuration between FIGS. 12 and 11 will be described.

The optical isolator 112 does not include the second polarizer 88 or the polarizer holder 166. The other configurations are the same as those of the optical isolator 111 shown in FIG. 11.

4.6 Modification 3

4.6.1 Configuration

Figure 13:
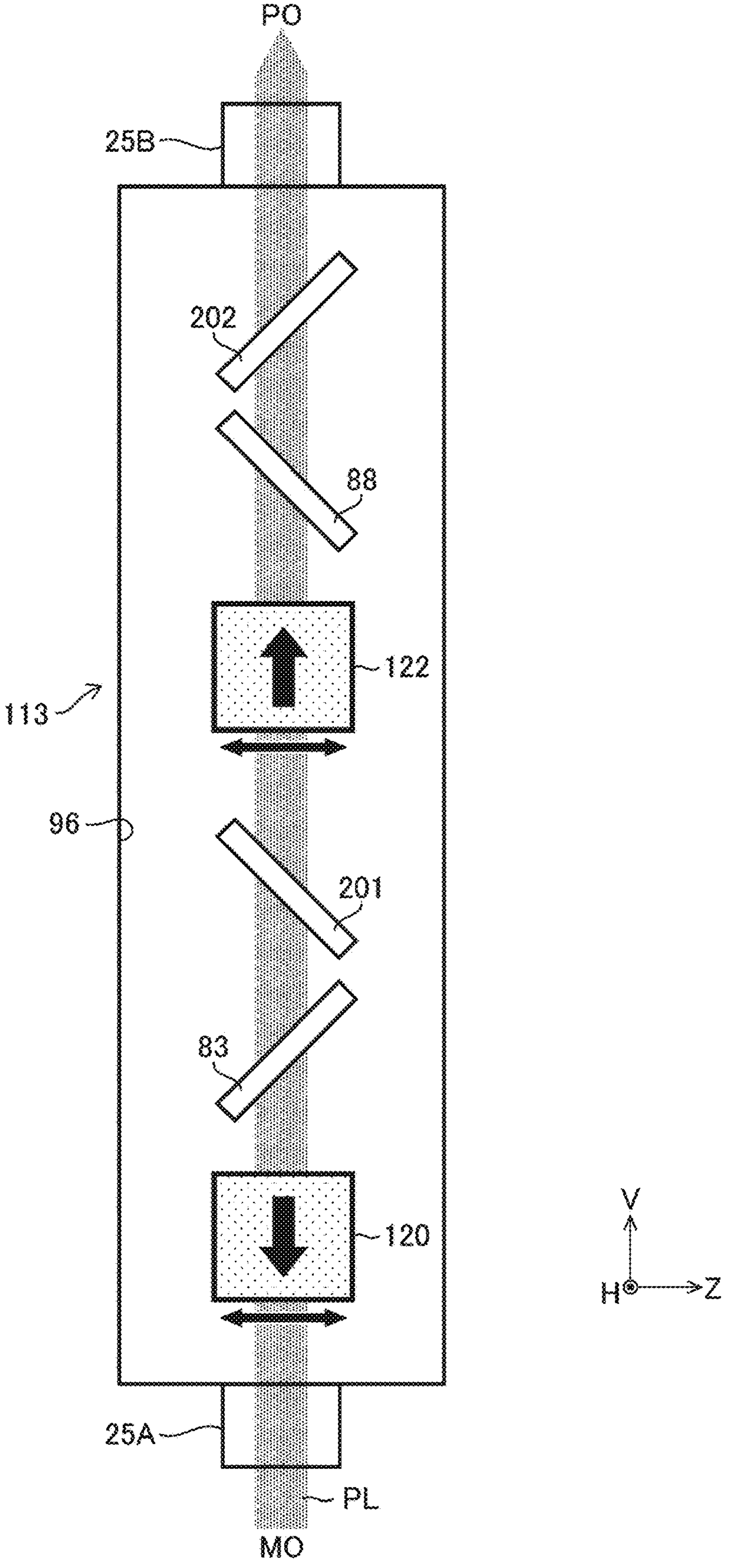
FIG. 13 schematically shows the configuration of an optical isolator according to Modification 3.

FIG. 13 schematically shows the configuration of an optical isolator 113 according to Modification 3. The optical isolator 113 in FIG. 13 may be employed in place of the optical isolator 110 described with reference to FIGS. 5 to 10. Differences in configuration between FIGS. 13 and 5 will be described.

The optical isolator 113 includes an optical axis shift canceler 201, which is disposed on the optical path between the first polarizer 83 and the Faraday rotator 122, and an optical axis shift canceler 202 disposed on the optical path between the second polarizer 88 and the bellows 25B. The optical axis shift canceler 202 is disposed at the side closer to the PO 26 than the second polarizer 88, that is, at the light exiting side of the second polarizer 88 on the optical path of the pulse laser light PL output from the Faraday rotator 122 and traveling toward the second polarizer 88.

The optical axis shift cancelers 201 and 202 may each, for example, be a parallel flat plate made of calcium fluoride. The optical axis shift canceler 201 is an example of the "first optical axis shift canceler" in the present disclosure. The optical axis shift canceler 202 is an example of the "second optical axis shift canceler" in the present disclosure.

The optical axis shift canceler 201 may be disposed in the polarizer holder 146 of the magnet block MGB1. The optical axis shift canceler 202 may be disposed in the polarizer holder 166 of the magnet block MGB2.

4.6.2 Operation

The optical axis of the pulse laser light PL output from the MO 22 is offset before and after the pulse laser light PL passes through the first polarizer 83. The disposed optical axis shift canceler 201 cancels the offset.

Similarly, the optical axis of the pulse laser light PL output from the MO 22 is offset before and after the pulse laser light PL passes through the second polarizer 88. The disposed optical axis shift canceler 202 cancels the offset. In the configuration in which the second polarizer 88 is not disposed, the optical axis shift canceler 202 is also unnecessary.

4.6.3 Effects and Advantages

The optical isolator 113 according to Modification 3, in which the optical axis shift canceler 201 is disposed, causes the optical axis of the pulse laser light PL passing through the Faraday material 130 to coincide with the optical axis of the pulse laser light PL passing through the Faraday material 150.

Furthermore, disposing the optical axis shift canceler 202 causes the optical axis of the pulse laser light PL passing through the Faraday material 130 to coincide with the optical axis of the pulse laser light PL output from the optical isolator 113 toward the PO 26. The other effects and advantages are the same as those provided by the first embodiment.

5. Second Embodiment

5.1 Configuration

Figure 14:
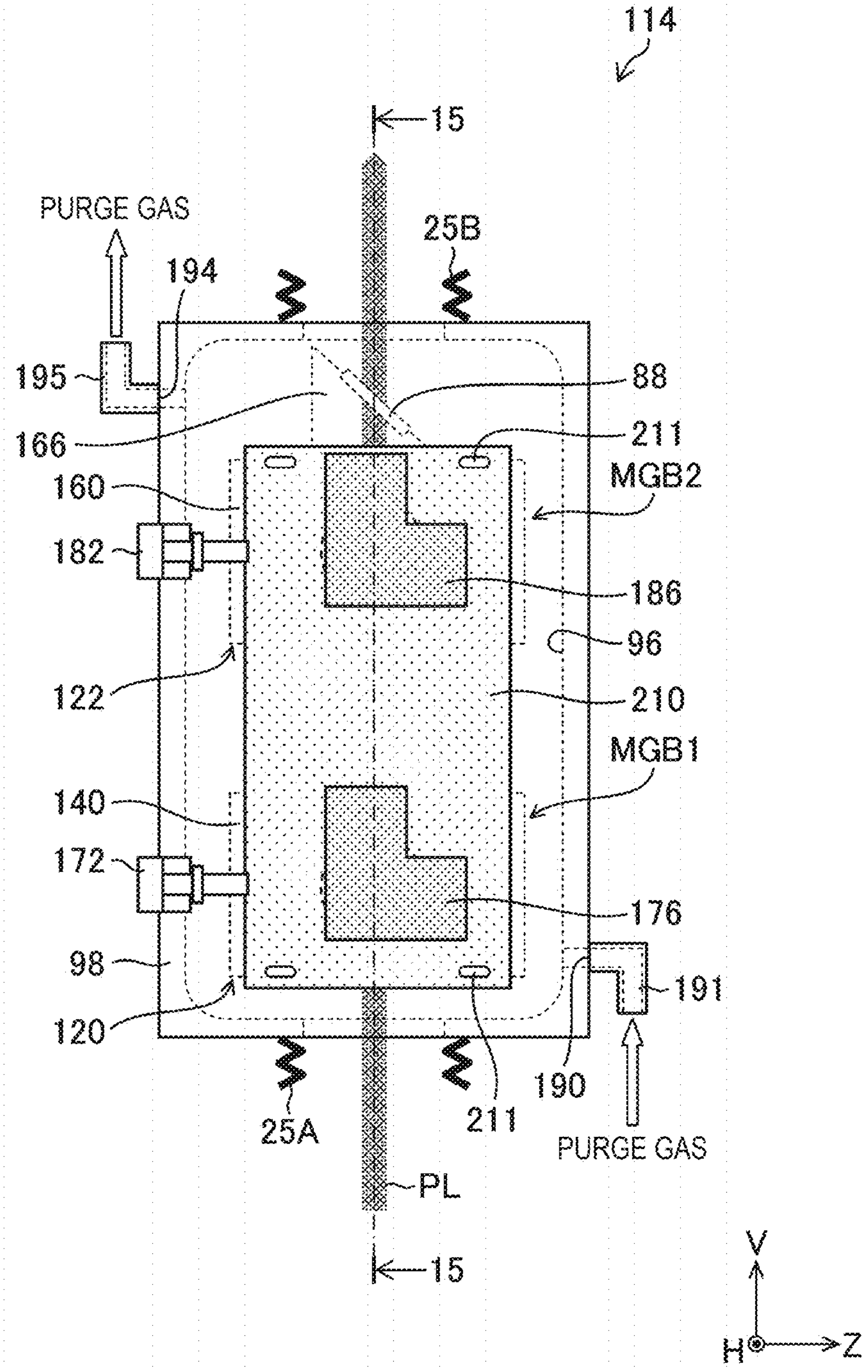
FIG. 14 schematically shows the configuration of an optical isolator according to a second embodiment.
Figure 15:
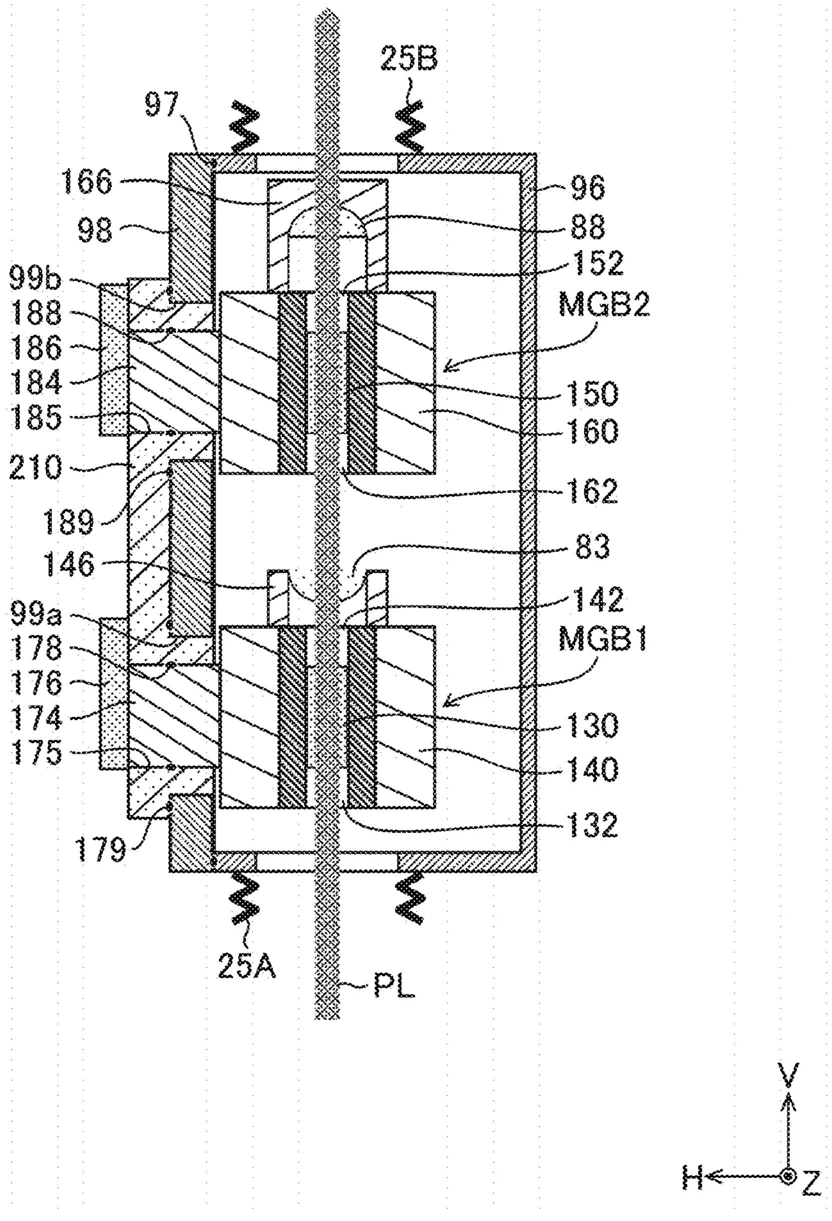
FIG. 15 is a cross-sectional view taken along the line 15-15 in FIG. 14.

FIG. 14 schematically shows the configuration of an optical isolator 114 according to a second embodiment. FIG. 15 is a cross-sectional view taken along the line 15-15 in FIG. 14. The optical isolator 114 in FIG. 14 may be employed in place of the optical isolator 110 described with reference to FIGS. 5 to 10. Differences in configuration between FIGS. 14 and 15 and FIGS. 9 and 10 will be described.

In the optical isolator 114, a slide plate 210, which functions both as the slide plates 170 and 180, is disposed in place of the slide plates 170 and 180 in the optical isolator 110. The slide plate 210 has through holes 211 in place of the through holes 171 and 181. The other configurations may be the same as those in the first embodiment.

5.2 Operation

The adjustment of the slide plate 210 in the Z direction is performed by using the direction-Z adjustment screws 172 and 182. The adjustment of the slide plate 210 in the Z direction may instead be performed by using only one of the direction-Z adjustment screws 172 and 182. The other operations are the same as those in the first embodiment.

The slide plate 210 is an example of the "third slide plate" in the present disclosure.

5.3 Effects and Advantages

The optical isolator 114 according to the second embodiment allows, in addition to providing the effects and advantages provided by the first embodiment, the adjustment to be performed without disturbing the relative positional relationship between the two magnet blocks MGB1 and MGB2, so that the adjustment period can be shortened.

6. Another Example of Configuration of Ultraviolet Laser Apparatus

The oscillation-stage laser is not limited to a narrowed-line gas laser, such as the MO 22 shown in FIG. 4, and may be an ultraviolet solid-state laser that outputs pulse laser light having an ultraviolet wavelength. For example, the oscillation-stage laser may be a solid-state laser that oscillates at a wavelength of about 193.4 nm, or an ultraviolet solid-state laser that outputs fourth harmonic light from a titanium sapphire laser (outputting light having wavelength of about 774 nm).

The amplification-stage laser is not limited to the configuration including a Fabry-Perot type resonator, such as the PO 26 shown in FIG. 4, but may have a configuration including a ring resonator. Furthermore, the amplification-stage laser is not limited to the configuration including an optical resonator, but may instead be a simple amplifier. For example, the amplification-stage laser may be a multi-pass amplifier, such as a three-pass amplifier in which seed light is reflected off a cylindrical mirror and passes through the discharge space three times for amplification.

7. Electronic Device Manufacturing Method

Figure 16:
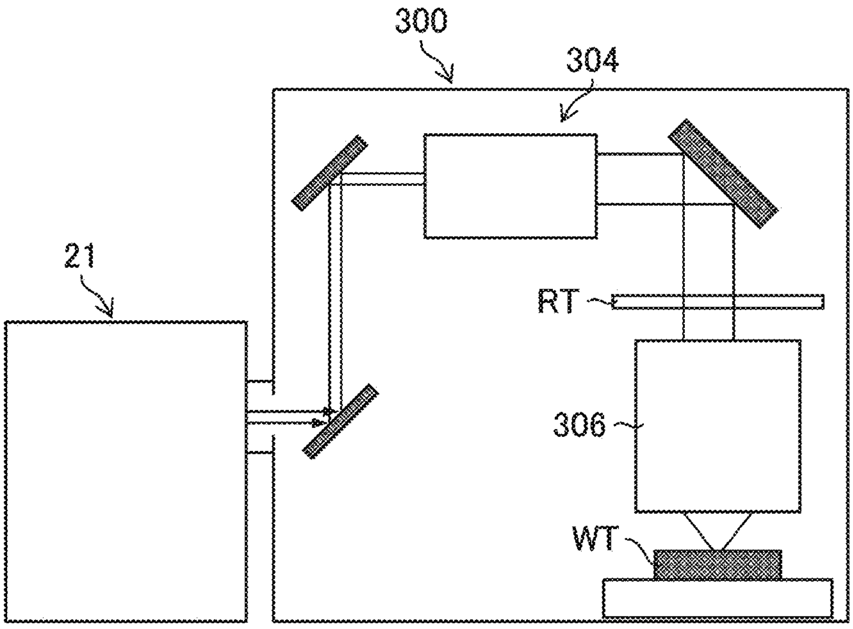
FIG. 16 schematically shows an example of the configuration of an exposure apparatus.

FIG. 16 schematically shows an example of the configuration of an exposure apparatus 300. The exposure apparatus 300 includes an illumination optical system 304 and a projection optical system 306. The ultraviolet laser apparatus 21 generates laser light and outputs the laser light to the exposure apparatus 300. The illumination optical system 304 illuminates a reticle pattern of a reticle that is not shown but is placed on a reticle stage RT with the laser light incident from the ultraviolet laser apparatus 21. The projection optical system 306 performs reduction projection on the laser light having passed through the reticle to bring the laser light into focus on a workpiece that is not shown but is placed on a workpiece table WT. The workpiece is a photosensitive substrate onto which a photoresist has been applied, such as a semiconductor wafer.

The exposure apparatus 300 translates the reticle stage RT and the workpiece table WT in synchronization with each other to expose the workpiece to the laser light having reflected the reticle pattern. Semiconductor devices can be manufactured by transferring the reticle pattern onto the semiconductor wafer in the exposure step described above and then carrying out a plurality of other steps. The semiconductor devices are an example of the "electronic devices" in the present disclosure.

8. Others

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious for those skilled in the art that embodiments of the present disclosure would be appropriately combined.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more". Further, "at least one of A, B, and C" should be interpreted to mean any of A, B, C, A+B, A+C, B+C, and A+B+C as well as to include combinations of any thereof and any other than A, B, and C.

What is claimed is:

1. An optical isolator comprising:

an enclosure;

a first polarizer disposed in the enclosure so as to transmit linearly polarized incident light having an ultraviolet wavelength;

a first Faraday rotator including a first Faraday material configured to rotate a polarization direction of the light having passed through the first polarizer in a first rotational direction, and a first magnet configured to produce a first magnetic field applied to a first magnetic field generation region where the first Faraday material is disposed, the first Faraday rotator disposed in the enclosure;

a first position adjustment mechanism configured to move the first Faraday material relative to the enclosure;

a second Faraday rotator disposed in the enclosure at a side of the first polarizer on which the incident light is incident and including a second Faraday material configured to rotate the polarization direction of the incident light incident on the first polarizer in a second rotational direction opposite to the first rotational direction, and a second magnet configured to produce a second magnetic field applied to a second magnetic field generation region where the second Faraday material is disposed; and a second position adjustment mechanism configured to move the second Faraday material relative to the enclosure, a cross-sectional shape of the first Faraday material in a cross section perpendicular to an optical axis of the light passing through the first Faraday material and a cross-sectional shape of the first magnetic field generation region having major axes in the same direction, the first position adjustment mechanism moving the first Faraday material in a direction of a minor axis perpendicular to the major axis, a cross-sectional shape of the second Faraday material in a cross section perpendicular to an optical axis of the light passing through the second Faraday material and a cross-sectional shape of the second magnetic field generation region having major axes in the same direction, and the second position adjustment mechanism moving the second Faraday material in a direction of a minor axis perpendicular to the major axis of the cross-sectional shape of the second Faraday material.

2. The optical isolator according to claim 1, further comprising a first rotational mechanism configured to rotate the first Faraday material around an axis perpendicular to the optical axis of the incident light and a direction of the minor axis of the first Faraday material.

3. The optical isolator according to claim 1, further comprising a second rotational mechanism configured to rotate the second Faraday material around an axis perpendicular to the optical axis of the incident light and the direction of the minor axis of the cross-sectional shape of the second Faraday material.

4. The optical isolator according to claim 1, wherein the second Faraday rotator and the first polarizer are integrated with each other into an integral structure.

5. The optical isolator according to claim 1, further comprising a second polarizer disposed in the enclosure so as to transmit the light output from the first Faraday rotator.

6. The optical isolator according to claim 5, wherein the first Faraday rotator and the second polarizer are integrated with each other into an integral structure.

7. The optical isolator according to claim 5, further comprising a second optical axis shift canceler disposed in the enclosure at a light exiting side of the second polarizer on an optical path of the light traveling from the first Faraday rotator toward the second polarizer and configured to cancel an optical axis offset caused by the second polarizer.

8. The optical isolator according to claim 1, wherein the first Faraday rotator and the first polarizer are integrated with each other into an integral structure.

9. The optical isolator according to claim 1, wherein the enclosure is a sealable enclosure, and the enclosure has a gas inlet and a gas outlet.

10. The optical isolator according to claim 1, further comprising a first optical axis shift canceler disposed between the first polarizer and the first Faraday rotator in the enclosure and configured to cancel an optical axis offset caused by the first polarizer.

11. The optical isolator according to claim 1, wherein the first Faraday material is calcium fluoride.

12. The optical isolator according to claim 1, wherein the second Faraday material is calcium fluoride.

13. The optical isolator according to claim 1, wherein the first position adjustment mechanism includes a first adjustment screw fixed to the enclosure, and a first slide plate to be moved by the first adjustment screw in the direction of the minor axis, and the first Faraday rotator is supported by the first slide plate.

14. The optical isolator according to claim 1, wherein the second position adjustment mechanism includes a second adjustment screw fixed to the enclosure, and a second slide plate to be moved by the second adjustment screw in the direction of the minor axis, and the second Faraday rotator is supported by the second slide plate.

15. An optical isolator comprising:

an enclosure;

a first polarizer disposed in the enclosure so as to transmit linearly polarized incident light having an ultraviolet wavelength;

a first Faraday rotator including a first Faraday material configured to rotate a polarization direction of the light having passed through the first polarizer in a first rotational direction, and a first magnet configured to produce a first magnetic field applied to a first magnetic field generation region where the first Faraday material is disposed, the first Faraday rotator disposed in the enclosure;

a first position adjustment mechanism configured to move the first Faraday material relative to the enclosure; and a second Faraday rotator disposed in the enclosure at a side of the first polarizer on which the incident light is incident and including a second Faraday material configured to rotate the polarization direction of the incident light incident on the first polarizer in a second rotational direction opposite to the first rotational direction, and a second magnet configured to produce a second magnetic field applied to a second magnetic field generation region where the second Faraday material is disposed, a cross-sectional shape of the first Faraday material in a cross section perpendicular to an optical axis of the light passing through the first Faraday material and a cross-sectional shape of the first magnetic field generation region having major axes in the same direction, and the first position adjustment mechanism moving the first Faraday material in a direction of a minor axis perpendicular to the major axis, a cross-sectional shape of the second Faraday material in a cross section perpendicular to an optical axis of the light passing through the second Faraday material and a cross-sectional shape of the second magnetic field generation region having major axes in the same direction, and the first position adjustment mechanism moving the second Faraday material along with the first Faraday material in a direction of a minor axis perpendicular to the major axis of the cross-sectional shape of the second Faraday material.

16. The optical isolator according to claim 15, wherein the first position adjustment mechanism includes a first adjustment screw fixed to the enclosure, and a third slide plate moved by the first adjustment screw in the direction of the minor axis, the first and second Faraday rotators are supported by the third slide plate, and moving the third slide plate moves the second Faraday material along with the first Faraday material relative to the enclosure.

17. An ultraviolet laser apparatus comprising:

an oscillation-stage laser configured to output linearly polarized pulse laser light having an ultraviolet wavelength;

an amplifier configured to amplify the pulse laser light and output the amplified pulse laser light; and an optical isolator disposed on an optical path between the oscillation-stage laser and the amplifier, the optical isolator including an enclosure, a first polarizer disposed in the enclosure so as to transmit linearly polarized incident light having the ultraviolet wavelength, a first Faraday rotator including a first Faraday material configured to rotate a polarization direction of the pulse laser light having passed through the first polarizer in a first rotational direction, and a first magnet configured to produce a first magnetic field applied to a first magnetic field generation region where the first Faraday material is disposed, the first Faraday rotator disposed in the enclosure, a first position adjustment mechanism configured to move the first Faraday material relative to the enclosure, a second Faraday rotator disposed in the enclosure at a side of the first polarizer on which the incident light is incident and including a second Faraday material configured to rotate the polarization direction of the incident light incident on the first polarizer in a second rotational direction opposite to the first rotational direction, and a second magnet configured to produce a second magnetic field applied to a second magnetic field generation region where the second Faraday material is disposed, and a second position adjustment mechanism configured to move the second Faraday material relative to the enclosure, a cross-sectional shape of the first Faraday material in a cross section perpendicular to an optical axis of the light passing through the first Faraday material and a cross-sectional shape of the first magnetic field generation region having major axes in the same direction, the first position adjustment mechanism moving the first Faraday material in a direction of a minor axis perpendicular to the major axis, a cross-sectional shape of the second Faraday material in a cross section perpendicular to an optical axis of the light passing through the second Faraday material and a cross-sectional shape of the second magnetic field generation region having major axes in the same direction, and the second position adjustment mechanism moving the second Faraday material in a direction of a minor axis perpendicular to the major axis of the cross-sectional shape of the second Faraday material.

18. An electronic device manufacturing method performed by using an ultraviolet laser apparatus including an oscillation-stage laser configured to output linearly polarized pulse laser light having an ultraviolet wavelength, an amplifier configured to amplify the pulse laser light and output the amplified pulse laser light, and an optical isolator disposed on an optical path between the oscillation-stage laser and the amplifier, the optical isolator including an enclosure, a first polarizer disposed in the enclosure so as to transmit linearly polarized incident light having the ultraviolet wavelength, a first Faraday rotator including a first Faraday material configured to rotate a polarization direction of the pulse laser light having passed through the first polarizer in a first rotational direction, and a first magnet configured to produce a first magnetic field applied to a first magnetic field generation region where the first Faraday material is disposed, the first Faraday rotator disposed in the enclosure, a first position adjustment mechanism configured to move the first Faraday material relative to the enclosure, a second Faraday rotator disposed in the enclosure at a side of the first polarizer on which the incident light is incident and including a second Faraday material configured to rotate the polarization direction of the incident light incident on the first polarizer in a second rotational direction opposite to the first rotational direction, and a second magnet configured to produce a second magnetic field applied to a second magnetic field generation region where the second Faraday material is disposed, and a second position adjustment mechanism configured to move the second Faraday material relative to the enclosure, a cross-sectional shape of the first Faraday material in a cross section perpendicular to an optical axis of the light passing through the first Faraday material and a cross-sectional shape of the first magnetic field generation region having major axes in the same direction, the first position adjustment mechanism moving the first Faraday material in a direction of a minor axis perpendicular to the major axis, a cross-sectional shape of the second Faraday material in a cross section perpendicular to an optical axis of the light passing through the second Faraday material and a cross-sectional shape of the second magnetic field generation region having major axes in the same direction, and the second position adjustment mechanism moving the second Faraday material in a direction of a minor axis perpendicular to the major axis of the cross-sectional shape of the second Faraday material, the method comprising:

generating laser light amplified by the amplifier by using the ultraviolet laser apparatus;

outputting the amplified laser light to an exposure apparatus; and exposing a photosensitive substrate to the laser light in the exposure apparatus to manufacture electronic devices.

* * * * *